(12) United States Patent
Berenzweig et al.

(10) Patent No.: US 11,216,069 B2
(45) Date of Patent: Jan. 4, 2022

(54) SYSTEMS AND METHODS FOR IMPROVED SPEECH RECOGNITION USING NEUROMUSCULAR INFORMATION

(71) Applicant: Facebook Technologies, LLC, Menlo Park, CA (US)

(72) Inventors: Adam Berenzweig, Brooklyn, NY (US); Patrick Kaifosh, New York, NY (US); Alan Huan Du, New York, NY (US); Jeffrey Scott Seely, New York, NY (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/974,430

(22) Filed: May 8, 2018

(65) Prior Publication Data

US 2019/0348026 A1 Nov. 14, 2019

(51) Int. Cl.
*G06F 3/01* (2006.01)
*G10L 15/14* (2006.01)
(Continued)

(52) U.S. Cl.
CPC .............. *G06F 3/015* (2013.01); *G10L 15/14* (2013.01); *G10L 15/24* (2013.01); *G10L 15/26* (2013.01)

(58) Field of Classification Search
None
See application file for complete search history.

(56) References Cited

U.S. PATENT DOCUMENTS

| 1,411,995 A | 4/1922 | Dull |
| 3,580,243 A | 5/1971 | Johnson et al. |
(Continued)

FOREIGN PATENT DOCUMENTS

| CA | 2902045 A1 | 8/2014 |
| CA | 2921954 A1 | 2/2015 |
(Continued)

OTHER PUBLICATIONS

International Search Report and Written Opinion for International Application No. PCT/US2017/043686 dated Oct. 6, 2017.
(Continued)

*Primary Examiner* — Antim G Shah
(74) *Attorney, Agent, or Firm* — FisherBroyles, LLP

(57) ABSTRACT

Systems and methods for using neuromuscular information to improve speech recognition. The system includes a plurality of neuromuscular sensors arranged on one or more wearable devices and configured to continuously record a plurality of neuromuscular signals from a user, at least one storage device configured to store one or more trained statistical models for determining text based on audio input and the plurality of neuromuscular signals, at least one input interface configured to receive the audio input, and at least one computer processor programmed to obtain the audio input and the plurality of neuromuscular signals, provide as input to the one or more trained statistical models, the audio input and the plurality of neuromuscular signals or signals derived from the plurality of neuromuscular signals, and determine based, at least in part, on an output of the one or more trained statistical models, the text.

24 Claims, 7 Drawing Sheets

(51) Int. Cl.
  *G10L 15/26* (2006.01)
  *G10L 15/24* (2013.01)

(56) References Cited

U.S. PATENT DOCUMENTS

| | | |
|---|---|---|
| 3,620,208 A | 11/1971 | Higley |
| 3,880,146 A | 4/1975 | Everett et al. |
| 4,055,168 A | 10/1977 | Miller et al. |
| 4,602,639 A | 7/1986 | Hoogendoorn et al. |
| 4,705,408 A | 11/1987 | Jordi |
| 4,817,064 A | 3/1989 | Milles |
| 4,896,120 A | 1/1990 | Kamil |
| 5,003,978 A | 4/1991 | Dunseath, Jr. |
| D322,227 S | 12/1991 | Warhol |
| 5,081,852 A | 1/1992 | Cox |
| 5,251,189 A | 10/1993 | Thorp |
| D348,660 S | 7/1994 | Parsons |
| 5,445,869 A | 8/1995 | Ishikawa et al. |
| 5,462,065 A | 10/1995 | Cusimano |
| 5,482,051 A | 1/1996 | Reddy et al. |
| 5,605,059 A | 2/1997 | Woodward |
| 5,625,577 A | 4/1997 | Kunii et al. |
| 5,683,404 A | 11/1997 | Johnson |
| 6,005,548 A | 12/1999 | Latypov et al. |
| 6,009,210 A | 12/1999 | Kand |
| 6,032,530 A | 3/2000 | Hock |
| 6,184,847 B1 | 2/2001 | Fateh et al. |
| 6,238,338 B1 | 5/2001 | DeLuca et al. |
| 6,244,873 B1 | 6/2001 | Hill et al. |
| 6,377,277 B1 | 4/2002 | Yamamoto |
| D459,352 S | 6/2002 | Giovanniello |
| 6,411,843 B1 | 6/2002 | Zarychta |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,658,287 B1 | 12/2003 | Litt et al. |
| 6,720,984 B1 | 4/2004 | Jorgensen et al. |
| 6,743,982 B2 | 6/2004 | Biegelsen et al. |
| 6,774,885 B1 | 8/2004 | Even-Zohar |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,927,343 B2 | 8/2005 | Watanabe et al. |
| 6,942,621 B2 | 9/2005 | Avinash et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,086,218 B1 | 8/2006 | Pasach |
| 7,089,148 B1 | 8/2006 | Bachmann et al. |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,351,975 B2 | 4/2008 | Brady et al. |
| 7,450,107 B2 | 11/2008 | Radley-Smith |
| 7,491,892 B2 | 2/2009 | Wanger et al. |
| 7,517,725 B2 | 4/2009 | Reis |
| 7,558,622 B2 | 7/2009 | Tran |
| 7,574,253 B2 | 8/2009 | Edney et al. |
| 7,580,742 B2 | 8/2009 | Tan et al. |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,787,946 B2 | 8/2010 | Stahmann et al. |
| 7,805,386 B2 | 9/2010 | Greer |
| 7,809,435 B1 | 10/2010 | Ettare et al. |
| 7,844,310 B2 | 11/2010 | Anderson |
| 7,870,211 B2 | 1/2011 | Pascal et al. |
| 7,901,368 B2 | 3/2011 | Flaherty et al. |
| 7,925,100 B2 | 4/2011 | Howell et al. |
| 7,948,763 B2 | 5/2011 | Chuang |
| D643,428 S | 8/2011 | Janky et al. |
| D646,192 S | 10/2011 | Woode |
| 8,054,061 B2 | 11/2011 | Prance et al. |
| D654,622 S | 2/2012 | Hsu |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| 8,190,249 B1 | 5/2012 | Gharieb et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| 8,311,623 B2 | 11/2012 | Sanger |
| 8,351,651 B2 | 1/2013 | Lee |
| 8,355,671 B2 | 1/2013 | Kramer et al. |
| 8,389,862 B2 | 4/2013 | Arora et al. |
| 8,421,634 B2 | 4/2013 | Tan et al. |
| 8,427,977 B2 | 4/2013 | Workman et al. |
| D682,727 S | 5/2013 | Bulgari |
| 8,435,191 B2 | 5/2013 | Barboutis et al. |
| 8,437,844 B2 | 5/2013 | Syed Momen et al. |
| 8,447,704 B2 | 5/2013 | Tan et al. |
| 8,467,270 B2 | 6/2013 | Gossweiler, III et al. |
| 8,469,741 B2 | 6/2013 | Oster et al. |
| 8,484,022 B1 | 7/2013 | Vanhoucke |
| D689,862 S | 9/2013 | Liu |
| 8,591,411 B2 | 11/2013 | Banet et al. |
| D695,454 S | 12/2013 | Moore |
| 8,620,361 B2 | 12/2013 | Bailey et al. |
| 8,624,124 B2 | 1/2014 | Koo et al. |
| 8,702,629 B2 | 4/2014 | Giuffrida et al. |
| 8,704,882 B2 | 4/2014 | Turner |
| 8,718,980 B2 | 5/2014 | Garudadri et al. |
| 8,744,543 B2 | 6/2014 | Li et al. |
| 8,754,862 B2 | 6/2014 | Zaliva |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,880,163 B2 | 11/2014 | Barachant et al. |
| 8,883,287 B2 | 11/2014 | Boyce et al. |
| 8,890,875 B2 | 11/2014 | Jammes et al. |
| 8,892,479 B2 | 11/2014 | Tan et al. |
| 8,895,865 B2 | 11/2014 | Lenahan et al. |
| 8,912,094 B2 | 12/2014 | Koo et al. |
| 8,922,481 B1 | 12/2014 | Kauffman et al. |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,037,530 B2 | 5/2015 | Tan et al. |
| 9,086,687 B2 | 7/2015 | Park et al. |
| 9,092,664 B2 | 7/2015 | Forutanpour et al. |
| D736,664 S | 8/2015 | Paradise et al. |
| 9,146,730 B2 | 9/2015 | Lazar |
| D741,855 S | 10/2015 | Park et al. |
| 9,170,674 B2 | 10/2015 | Forutanpour et al. |
| D742,272 S | 11/2015 | Bailey et al. |
| D742,874 S | 11/2015 | Cheng et al. |
| D743,963 S | 11/2015 | Osterhout |
| 9,182,826 B2 | 11/2015 | Powledge et al. |
| 9,211,417 B2 | 12/2015 | Heldman et al. |
| 9,218,574 B2 | 12/2015 | Phillipps et al. |
| D747,714 S | 1/2016 | Erbeus |
| 9,235,934 B2 | 1/2016 | Mandella et al. |
| 9,240,069 B1 | 1/2016 | Li |
| D750,623 S | 3/2016 | Park et al. |
| D751,065 S | 3/2016 | Magi |
| 9,278,453 B2 | 3/2016 | Assad |
| 9,299,248 B2 | 3/2016 | Lake et al. |
| D756,359 S | 5/2016 | Bailey et al. |
| 9,351,653 B1 | 5/2016 | Harrison |
| 9,367,139 B2 | 6/2016 | Ataee et al. |
| 9,372,535 B2 | 6/2016 | Bailey et al. |

(56) References Cited

U.S. PATENT DOCUMENTS

| | | | |
|---|---|---|---|
| 9,389,694 B2 | 7/2016 | Ataee et al. |
| 9,393,418 B2 | 7/2016 | Giuffrida et al. |
| 9,408,316 B2 | 8/2016 | Bailey et al. |
| 9,418,927 B2 | 8/2016 | Axisa et al. |
| 9,439,566 B2 | 9/2016 | Arne et al. |
| 9,459,697 B2 | 10/2016 | Bedikian et al. |
| 9,472,956 B2 | 10/2016 | Michaelis et al. |
| 9,477,313 B2 | 10/2016 | Mistry et al. |
| 9,483,123 B2 | 11/2016 | Aleem et al. |
| 9,529,434 B2 | 12/2016 | Choi et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,437,335 B2 | 10/2019 | Daniels |
| 10,460,455 B2 | 10/2019 | Giurgica-Tiron et al. |
| 10,489,986 B2 | 11/2019 | Kaifosh et al. |
| 10,496,168 B2 | 12/2019 | Kaifosh et al. |
| 10,504,286 B2 | 12/2019 | Kaifosh et al. |
| 10,592,001 B2 | 3/2020 | Berenzweig et al. |
| 10,905,350 B2 | 2/2021 | Berenzweig et al. |
| 10,937,414 B2 | 3/2021 | Berenzweig et al. |
| 10,990,174 B2 | 4/2021 | Kaifosh et al. |
| 2002/0032386 A1 | 3/2002 | Snackner et al. |
| 2002/0077534 A1 | 6/2002 | DuRousseau |
| 2002/0094701 A1 | 7/2002 | Biegelsen et al. |
| 2002/0198472 A1 | 12/2002 | Kramer |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2003/0144829 A1 | 7/2003 | Geatz et al. |
| 2003/0171921 A1* | 9/2003 | Manabe ............... G10L 13/033 704/232 |
| 2003/0184544 A1 | 10/2003 | Prudent |
| 2004/0054273 A1 | 3/2004 | Finneran et al. |
| 2004/0068409 A1 | 4/2004 | Tanaka et al. |
| 2004/0073104 A1 | 4/2004 | Brun del Re et al. |
| 2004/0092839 A1 | 5/2004 | Shin et al. |
| 2004/0194500 A1 | 10/2004 | Rapport |
| 2004/0210165 A1 | 10/2004 | Marmaropoulos et al. |
| 2004/0243342 A1 | 12/2004 | Rekimoto |
| 2005/0005637 A1 | 1/2005 | Rapport |
| 2005/0012715 A1 | 1/2005 | Ford |
| 2005/0070227 A1 | 3/2005 | Shen et al. |
| 2005/0119701 A1 | 6/2005 | Lauter et al. |
| 2005/0177038 A1 | 8/2005 | Kolpin et al. |
| 2006/0037359 A1 | 2/2006 | Stinespring |
| 2006/0061544 A1 | 3/2006 | Min et al. |
| 2006/0121958 A1 | 6/2006 | Fung et al. |
| 2006/0129057 A1 | 6/2006 | Maekawa et al. |
| 2007/0009151 A1 | 1/2007 | Pittman et al. |
| 2007/0016265 A1 | 1/2007 | Davoodi et al. |
| 2007/0132785 A1 | 6/2007 | Ebersole, Jr. et al. |
| 2007/0172797 A1 | 7/2007 | Hada et al. |
| 2007/0177770 A1 | 8/2007 | Derchak et al. |
| 2007/0256494 A1 | 11/2007 | Nakamura et al. |
| 2007/0285399 A1 | 12/2007 | Lund |
| 2008/0051673 A1 | 2/2008 | Kong et al. |
| 2008/0052643 A1 | 2/2008 | Ike et al. |
| 2008/0103639 A1 | 5/2008 | Troy et al. |
| 2008/0103769 A1 | 5/2008 | Schultz et al. |
| 2008/0136775 A1 | 6/2008 | Conant |
| 2008/0214360 A1 | 9/2008 | Stirling et al. |
| 2008/0221487 A1 | 9/2008 | Zohar et al. |
| 2008/0262772 A1 | 10/2008 | Luinge et al. |
| 2009/0007597 A1 | 1/2009 | Hanevold |
| 2009/0027337 A1 | 1/2009 | Hildreth |
| 2009/0031757 A1 | 2/2009 | Harding |
| 2009/0040016 A1 | 2/2009 | Ikeda |
| 2009/0051544 A1 | 2/2009 | Niknejad |
| 2009/0079813 A1 | 3/2009 | Hildreth |
| 2009/0082692 A1 | 3/2009 | Hale et al. |
| 2009/0082701 A1 | 3/2009 | Zohar et al. |
| 2009/0102580 A1 | 4/2009 | Uchaykin |
| 2009/0112080 A1 | 4/2009 | Matthews |
| 2009/0124881 A1 | 5/2009 | Rytky |
| 2009/0189867 A1 | 7/2009 | Krah et al. |
| 2009/0251407 A1 | 10/2009 | Flake et al. |
| 2009/0318785 A1 | 12/2009 | Ishikawa et al. |
| 2009/0326406 A1* | 12/2009 | Tan ..................... G06F 3/015 600/546 |
| 2009/0327171 A1 | 12/2009 | Tan et al. |
| 2010/0030532 A1 | 2/2010 | Arora et al. |
| 2010/0041974 A1 | 2/2010 | Ting et al. |
| 2010/0063794 A1 | 3/2010 | Hernandez-Rebollar |
| 2010/0106044 A1 | 4/2010 | Linderman |
| 2010/0113910 A1 | 5/2010 | Brauers et al. |
| 2010/0228487 A1 | 9/2010 | Luethardt et al. |
| 2010/0249635 A1 | 9/2010 | Van Der Reijden |
| 2010/0280628 A1 | 11/2010 | Sankai |
| 2010/0292595 A1 | 11/2010 | Paul |
| 2010/0292606 A1 | 11/2010 | Prakash et al. |
| 2010/0292617 A1 | 11/2010 | Lei et al. |
| 2010/0293115 A1 | 11/2010 | Seyed Momen |
| 2010/0315266 A1 | 12/2010 | Gunawardana et al. |
| 2010/0317958 A1 | 12/2010 | Bech et al. |
| 2011/0018754 A1 | 1/2011 | Tojima et al. |
| 2011/0077484 A1 | 3/2011 | Van Slyke et al. |
| 2011/0082838 A1 | 4/2011 | Niemelä |
| 2011/0092826 A1 | 4/2011 | Lee et al. |
| 2011/0134026 A1 | 6/2011 | Kang et al. |
| 2011/0151974 A1 | 6/2011 | Deaguero |
| 2011/0166434 A1 | 7/2011 | Gargiulo |
| 2011/0172503 A1 | 7/2011 | Knepper et al. |
| 2011/0173204 A1 | 7/2011 | Murillo et al. |
| 2011/0173574 A1 | 7/2011 | Clavin et al. |
| 2011/0213278 A1 | 9/2011 | Horak et al. |
| 2011/0224556 A1 | 9/2011 | Moon et al. |
| 2011/0224564 A1 | 9/2011 | Moon et al. |
| 2011/0230782 A1 | 9/2011 | Bartol et al. |
| 2011/0248914 A1 | 10/2011 | Sherr |
| 2011/0313762 A1 | 12/2011 | Ben-David et al. |
| 2012/0029322 A1 | 2/2012 | Wartena et al. |
| 2012/0051005 A1 | 3/2012 | Vanfleteren et al. |
| 2012/0066163 A1 | 3/2012 | Balls et al. |
| 2012/0101357 A1 | 4/2012 | Hoskuldsson et al. |
| 2012/0157789 A1 | 6/2012 | Kangas et al. |
| 2012/0165695 A1 | 6/2012 | Kidmose et al. |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0265090 A1 | 10/2012 | Fink et al. |
| 2012/0265480 A1 | 10/2012 | Oshima |
| 2012/0283526 A1 | 11/2012 | Gommesen et al. |
| 2012/0293548 A1 | 11/2012 | Perez et al. |
| 2012/0302858 A1 | 11/2012 | Kidmose et al. |
| 2012/0323521 A1 | 12/2012 | De Foras et al. |

(56) References Cited

U.S. PATENT DOCUMENTS

| | | |
|---|---|---|
| 2013/0004033 A1 | 1/2013 | Trugenberger |
| 2013/0005303 A1 | 1/2013 | Song et al. |
| 2013/0020948 A1 | 1/2013 | Han et al. |
| 2013/0027341 A1 | 1/2013 | Mastandrea |
| 2013/0077820 A1 | 3/2013 | Marais et al. |
| 2013/0080794 A1 | 3/2013 | Hsieh |
| 2013/0123656 A1 | 5/2013 | Heck |
| 2013/0127708 A1 | 5/2013 | Jung et al. |
| 2013/0131538 A1 | 5/2013 | Gaw et al. |
| 2013/0135223 A1 | 5/2013 | Shai |
| 2013/0141375 A1 | 6/2013 | Ludwig et al. |
| 2013/0144629 A1* | 6/2013 | Johnston ............... G06F 3/017 704/275 |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0207889 A1 | 8/2013 | Chang et al. |
| 2013/0217998 A1 | 8/2013 | Mahfouz et al. |
| 2013/0232095 A1 | 9/2013 | Tan et al. |
| 2013/0265229 A1* | 10/2013 | Forutanpour ......... G06F 3/0414 345/158 |
| 2013/0265437 A1 | 10/2013 | Thorn et al. |
| 2013/0271292 A1 | 10/2013 | McDermott |
| 2013/0312256 A1 | 11/2013 | Wesselmann et al. |
| 2013/0317382 A1 | 11/2013 | Le |
| 2013/0317648 A1 | 11/2013 | Assad |
| 2013/0332196 A1 | 12/2013 | Pinsker |
| 2014/0020945 A1 | 1/2014 | Hurwitz et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0052150 A1 | 2/2014 | Taylor et al. |
| 2014/0121471 A1 | 3/2014 | Walker |
| 2014/0122958 A1 | 3/2014 | Greenebrg et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0107493 A1 | 4/2014 | Yuen et al. |
| 2014/0142937 A1* | 5/2014 | Powledge ............... G06F 3/017 704/235 |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1 | 7/2014 | Forutanpour et al. |
| 2014/0223462 A1 | 8/2014 | Aimone et al. |
| 2014/0236031 A1 | 8/2014 | Banet et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0257141 A1 | 9/2014 | Giuffrida et al. |
| 2014/0277622 A1 | 9/2014 | Raniere |
| 2014/0278441 A1* | 9/2014 | Ton ....................... G10L 21/00 704/275 |
| 2014/0285326 A1 | 9/2014 | Luna et al. |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0310595 A1 | 10/2014 | Acharya et al. |
| 2014/0330404 A1 | 11/2014 | Abdelghani et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0358024 A1 | 12/2014 | Nelson et al. |
| 2014/0361988 A1 | 12/2014 | Katz et al. |
| 2014/0364703 A1 | 12/2014 | Kim et al. |
| 2014/0365163 A1 | 12/2014 | Jallon |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0070270 A1 | 3/2015 | Bailey et al. |
| 2015/0070274 A1 | 3/2015 | Morozov |
| 2015/0084860 A1 | 3/2015 | Aleem et al. |
| 2015/0094564 A1 | 4/2015 | Tashman et al. |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0157944 A1 | 6/2015 | Gottlieb |
| 2015/0160621 A1 | 6/2015 | Almaz |
| 2015/0169074 A1 | 6/2015 | Ataee et al. |
| 2015/0177841 A1* | 6/2015 | VanBlon ................. G06F 1/163 715/863 |
| 2015/0182113 A1 | 7/2015 | Utter, II |
| 2015/0182130 A1 | 7/2015 | Utter, II |
| 2015/0182160 A1 | 7/2015 | Kim et al. |
| 2015/0182163 A1 | 7/2015 | Utter |
| 2015/0182164 A1 | 7/2015 | Utter, II |
| 2015/0182165 A1 | 7/2015 | Miller et al. |
| 2015/0186609 A1 | 7/2015 | Utter, II |
| 2015/0187355 A1* | 7/2015 | Parkinson .............. G06F 3/017 704/235 |
| 2015/0193949 A1 | 7/2015 | Katz et al. |
| 2015/0216475 A1 | 8/2015 | Luna et al. |
| 2015/0220152 A1 | 8/2015 | Tait et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0261306 A1 | 9/2015 | Lake |
| 2015/0261318 A1 | 9/2015 | Scavezze et al. |
| 2015/0277575 A1 | 10/2015 | Ataee et al. |
| 2015/0288944 A1* | 10/2015 | Nistico .................. G06T 15/20 345/156 |
| 2015/0296553 A1 | 10/2015 | DiFranco et al. |
| 2015/0302168 A1 | 10/2015 | De Sapio et al. |
| 2015/0309563 A1 | 10/2015 | Connor |
| 2015/0309582 A1 | 10/2015 | Gupta |
| 2015/0312175 A1 | 10/2015 | Langholz |
| 2015/0313496 A1 | 11/2015 | Connor |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2016/0011668 A1 | 1/2016 | Gilad-Bachrach et al. |
| 2016/0020500 A1 | 1/2016 | Matsuda |
| 2016/0026853 A1 | 1/2016 | Wexler et al. |
| 2016/0049073 A1 | 2/2016 | Lee |
| 2016/0092504 A1 | 3/2016 | Mitri et al. |
| 2016/0144172 A1 | 5/2016 | Hsueh et al. |
| 2016/0150636 A1 | 5/2016 | Otsubo |
| 2016/0156762 A1 | 6/2016 | Bailey et al. |
| 2016/0162604 A1 | 6/2016 | Xioli et al. |
| 2016/0170710 A1* | 6/2016 | Kim ....................... G06F 3/013 704/275 |
| 2016/0187992 A1 | 6/2016 | Yamamoto et al. |
| 2016/0199699 A1 | 7/2016 | Klassen |
| 2016/0202081 A1 | 7/2016 | Debieuvre et al. |
| 2016/0207201 A1 | 7/2016 | Herr et al. |
| 2016/0235323 A1 | 8/2016 | Tadi et al. |
| 2016/0239080 A1 | 8/2016 | Marcolina et al. |
| 2016/0259407 A1 | 9/2016 | Schick |

(56) References Cited

U.S. PATENT DOCUMENTS

| | | |
|---|---|---|
| 2016/0262687 A1 | 9/2016 | Imperial |
| 2016/0274758 A1 | 9/2016 | Bailey |
| 2016/0275726 A1 | 9/2016 | Mullins |
| 2016/0292497 A1 | 10/2016 | Kehtarnavaz et al. |
| 2016/0309249 A1 | 10/2016 | Wu et al. |
| 2016/0313798 A1 | 10/2016 | Connor |
| 2016/0313801 A1 | 10/2016 | Wagner et al. |
| 2016/0313890 A1 | 10/2016 | Walline et al. |
| 2016/0313899 A1* | 10/2016 | Noel ................. G06F 3/017 |
| 2016/0350973 A1 | 12/2016 | Shapira et al. |
| 2017/0031502 A1 | 2/2017 | Rosenberg et al. |
| 2017/0035313 A1 | 2/2017 | Hong et al. |
| 2017/0061817 A1 | 3/2017 | Mettler May |
| 2017/0068445 A1 | 3/2017 | Lee et al. |
| 2017/0080346 A1 | 3/2017 | Abbas |
| 2017/0090604 A1 | 3/2017 | Barbier |
| 2017/0091567 A1 | 3/2017 | Wang et al. |
| 2017/0095178 A1 | 4/2017 | Schoen et al. |
| 2017/0119472 A1 | 5/2017 | Herrmann et al. |
| 2017/0123487 A1 | 5/2017 | Hazra et al. |
| 2017/0124816 A1 | 5/2017 | Yang et al. |
| 2017/0161635 A1 | 6/2017 | Oono et al. |
| 2017/0188878 A1 | 7/2017 | Lee |
| 2017/0188980 A1 | 7/2017 | Ash |
| 2017/0197142 A1 | 7/2017 | Stafford et al. |
| 2017/0259167 A1 | 9/2017 | Cook et al. |
| 2017/0262064 A1 | 9/2017 | Ofir et al. |
| 2017/0285756 A1 | 10/2017 | Wang et al. |
| 2017/0285848 A1 | 10/2017 | Rosenberg et al. |
| 2017/0296363 A1 | 10/2017 | Yetkin et al. |
| 2017/0301630 A1 | 10/2017 | Nguyen et al. |
| 2017/0308118 A1* | 10/2017 | Ito ......................... G06F 1/163 |
| 2017/0344706 A1 | 11/2017 | Torres et al. |
| 2017/0347908 A1 | 12/2017 | Watanabe et al. |
| 2018/0000367 A1 | 1/2018 | Longinotti-Buitoni |
| 2018/0020951 A1 | 1/2018 | Kaifosh et al. |
| 2018/0020978 A1 | 1/2018 | Kaifosh et al. |
| 2018/0024634 A1 | 1/2018 | Kaifosh et al. |
| 2018/0024635 A1 | 1/2018 | Kaifosh et al. |
| 2018/0024641 A1 | 1/2018 | Mao et al. |
| 2018/0064363 A1 | 3/2018 | Morun et al. |
| 2018/0067553 A1 | 3/2018 | Morun et al. |
| 2018/0081439 A1 | 3/2018 | Daniels |
| 2018/0088765 A1 | 3/2018 | Bailey |
| 2018/0092599 A1 | 4/2018 | Kerth et al. |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0120948 A1 | 5/2018 | Aleem et al. |
| 2018/0140441 A1 | 5/2018 | Poirters |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0178008 A1 | 6/2018 | Bouton et al. |
| 2018/0240459 A1 | 8/2018 | Weng et al. |
| 2018/0301057 A1 | 10/2018 | Hargrove et al. |
| 2018/0307314 A1 | 10/2018 | Connor |
| 2018/0321745 A1 | 11/2018 | Morun et al. |
| 2018/0321746 A1 | 11/2018 | Morun et al. |
| 2018/0333575 A1 | 11/2018 | Bouton |
| 2018/0344195 A1 | 12/2018 | Morun et al. |
| 2018/0360379 A1 | 12/2018 | Harrison et al. |
| 2019/0008453 A1 | 1/2019 | Spoof |
| 2019/0025919 A1 | 1/2019 | Tadi et al. |
| 2019/0033967 A1 | 1/2019 | Morun et al. |
| 2019/0033974 A1 | 1/2019 | Mu et al. |
| 2019/0038166 A1 | 2/2019 | Tavabi et al. |
| 2019/0076716 A1 | 3/2019 | Chiou et al. |
| 2019/0121305 A1 | 4/2019 | Kaifosh et al. |
| 2019/0121306 A1 | 4/2019 | Kaifosh et al. |
| 2019/0146809 A1 | 5/2019 | Lee et al. |
| 2019/0150777 A1 | 5/2019 | Guo et al. |
| 2019/0192037 A1 | 6/2019 | Morun et al. |
| 2019/0212817 A1 | 7/2019 | Kaifosh et al. |
| 2019/0223748 A1 | 7/2019 | Al-Natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1 | 8/2019 | Tran |
| 2019/0348027 A1 | 11/2019 | Berenzweig et al. |
| 2019/0357787 A1 | 11/2019 | Barachant et al. |
| 2019/0362557 A1 | 11/2019 | Lacey et al. |
| 2020/0065569 A1 | 2/2020 | Nduka et al. |
| 2020/0069210 A1 | 3/2020 | Berenzweig et al. |
| 2020/0069211 A1 | 3/2020 | Berenzweig et al. |
| 2020/0073483 A1 | 3/2020 | Berenzweig et al. |
| 2020/0097081 A1 | 3/2020 | Stone et al. |

FOREIGN PATENT DOCUMENTS

| | | |
|---|---|---|
| CA | 2939644 A1 | 8/2015 |
| CN | 1838933 A | 9/2006 |
| CN | 103777752 A | 5/2014 |
| CN | 105190578 A | 12/2015 |
| CN | 106102504 A | 11/2016 |
| CN | 110300542 A | 10/2019 |
| DE | 44 12 278 A1 | 10/1995 |
| EP | 0 301 790 A2 | 2/1989 |
| EP | 1 345 210 A2 | 9/2003 |
| EP | 2198521 B1 | 6/2012 |
| EP | 2 541 763 A1 | 1/2013 |
| EP | 2959394 A1 | 12/2015 |
| EP | 3104737 A1 | 12/2016 |
| EP | 3 487 395 A1 | 5/2019 |
| JP | H05-277080 A | 10/1993 |
| JP | 2005-095561 A | 4/2005 |
| JP | 2009-50679 A | 3/2009 |
| JP | 2010-520561 A | 6/2010 |
| JP | 2016-507851 A | 3/2016 |
| JP | 2017-509386 A | 4/2017 |
| KR | 10-2012-0094870 A | 8/2012 |
| KR | 10-2012-0097997 A | 9/2012 |
| KR | 2015-0123254 A | 11/2015 |
| KR | 2016-0121552 A | 10/2016 |
| KR | 10-2017-0107283 A | 9/2017 |
| KR | 10-1790147 B1 | 10/2017 |
| WO | WO 2008/109248 A2 | 9/2008 |
| WO | WO 2009/042313 A1 | 4/2009 |
| WO | WO 2010/104879 A2 | 9/2010 |
| WO | 2011/070554 A2 | 6/2011 |
| WO | 2012/155157 A1 | 11/2012 |
| WO | WO 2014/130871 A1 | 8/2014 |
| WO | WO 2014/186370 A1 | 11/2014 |
| WO | WO 2014/194257 A1 | 12/2014 |
| WO | WO 2014/197443 A1 | 12/2014 |
| WO | WO 2015/027089 A1 | 2/2015 |
| WO | WO 2015/073713 A1 | 5/2015 |
| WO | WO 2015/081113 A1 | 6/2015 |
| WO | 2015/100172 A1 | 7/2015 |
| WO | WO 2015/123445 A1 | 8/2015 |
| WO | WO 2015/199747 A1 | 12/2015 |
| WO | WO 2016/041088 A1 | 3/2016 |
| WO | WO 2017/062544 A1 | 4/2017 |
| WO | WO 2017/092225 A1 | 6/2017 |
| WO | WO 2017/120669 A1 | 7/2017 |
| WO | WO 2017/172185 A1 | 10/2017 |
| WO | 2017/208167 A1 | 12/2017 |
| WO | 2018/022602 A1 | 2/2018 |
| WO | 2019/099758 A1 | 5/2019 |
| WO | 2019/217419 A2 | 11/2019 |
| WO | 2020/047429 A1 | 3/2020 |
| WO | 2020/061440 A1 | 3/2020 |

OTHER PUBLICATIONS

International Preliminary Report on Patentability for International Application No. PCT/US2017/043686 dated Feb. 7, 2019.
International Search Report and Written Opinion for International Application No. PCT/US2017/043693 dated Oct. 6, 2017.

(56) References Cited

OTHER PUBLICATIONS

International Preliminary Report on Patentability for International Application No. PCT/US2017/043693 dated Feb. 7, 2019.
International Search Report and Written Opinion for International Application No. PCT/US2017/043791 dated Oct. 5, 2017.
International Preliminary Report on Patentability for International Application No. PCT/US2017/043791 dated Feb. 7, 2019.
International Search Report and Written Opinion for International Application No. PCT/US2017/043792 dated Oct. 5, 2017.
International Preliminary Report on Patentability for International Application No. PCT/US2017/043792 dated Feb. 7, 2019.
International Search Report and Written Opinion for International Application No. PCT/US2018/056768 dated Jan. 15, 2019.
International Search Report and Written Opinion for International Application No. PCT/US2018/061409 dated Mar. 12, 2019.
International Search Report and Written Opinion for International Application No. PCT/US2018/063215 dated Mar. 21, 2019.
International Search Report and Written Opinion for International Application No. PCT/US2019/015134 dated May 15, 2019.
International Search Report and Written Opinion for International Application No. PCT/US2019/015167 dated May 21, 2019.
International Search Report and Written Opinion for International Application No. PCT/US2019/015174 dated May 21, 2019.
International Search Report and Written Opinion for International Application No. PCT/US2019/015238 dated May 16, 2019.
International Search Report and Written Opinion for International Application No. PCT/US2019/015183 dated May 3, 2019.
International Search Report and Written Opinion for International Application No. PCT/US2019/015180 dated May 28, 2019.
International Search Report and Written Opinion for International Application No. PCT/US2019/015244 dated May 16, 2019.
International Search Report and Written Opinion for International Application No. PCT/US2019/037302 dated Oct. 11, 2019.
International Search Report and Written Opinion for International Application No. PCT/US2019/028299 dated Aug. 9, 2019.
International Search Report and Written Opinion for International Application No. PCT/US2019/034173 dated Sep. 18, 2019.
Invitation to Pay Additional Fees for International Application No. PCT/US2019/031114 dated Aug. 6, 2019.
International Search Report and Written Opinion for International Application No. PCT/US19/20065 dated May 16, 2019.
Arkenbout et al., Robust Hand Motion Tracking through Data Fusion of 5DT Data Glove and Nimble VR Kinect Camera Measurements. Sensors. 2015;15:31644-71.
Benko et al., Enhancing Input On and Above the Interactive Surface with Muscle Sensing. The ACM International Conference on Interactive Tabletops and Surfaces. ITS '09. 2009:93-100.
Boyali et al., Spectral Collaborative Representation based Classification for hand gestures recognition on electromyography signals. Biomedical Signal Processing and Control. 2016;24:11-18.
Cheng et al., A Novel Phonology- and Radical-Coded Chinese Sign Language Recognition Framework Using Accelerometer and Surface Electromyography Sensors. Sensors. 2015;15:23303-24.
Csapo et al., Evaluation of Human-Myo Gesture Control Capabilities in Continuous Search and Select Operations. 7th IEEE International Conference on Cognitive Infocornmunications. 2016;000415-20.
Davoodi et al., Development of a Physics-Based Target Shooting Game to Train Amputee Users of Multijoint Upper Limb Prostheses. Presence. Massachusetts Institute of Technology. 2012;21(1):85-95.
Delis et al., Development of a Myoelectric Controller Based on Knee Angle Estimation. BiodeVices 2009. International Conference on Biomedical Electronics and Devices. Jan. 17, 2009. 7 pages.
Diener et al., Direct conversion from facial myoelectric signals to speech using Deep Neural Networks. 2015 International Joint Conference on Neural Networks (IJCNN). Oct. 1, 2015. 7 pages.
Ding et al., HMM with improved feature extraction-based feature parameters for identity recognition of gesture command operators by using a sensed Kinect-data stream. Neurocomputing. 2017;262:108-19.

Farina et al., Man/machine interface based on the discharge timings of spinal motor neurons after targeted muscle reinnervation. Nature. Biomedical Engineering. 2017;1:1-12.
Favorskaya et al., Localization and Recognition of Dynamic Hand Gestures Based on Hierarchy of Manifold Classifiers. International Archives of the Photogrammetry, Remote Sensing and Spatial Information Sciences. 2015;XL-5/W6:1-8.
Galllna et al., Surface EMG Biofeedback. Surface Electromyography: Physiology, Engineering, and Applications. 2016:485-500.
Gopura et al., A Human Forearm and wrist motion assist exoskeleton robot with EMG-based fuzzy-neuro control. Proceedings of the 2nd IEEE/RAS-EMBS International Conference on Biomedical Robotics and Biomechatronics. Oct. 19-22, 2008. 6 pages.
Hauschild et al., A Virtual Reality Environment for Designing and Fitting Neural Prosthetic Limbs. IEEE Transactions on Neural Systems and Rehabilitation Engineering. 2007;15(1):9-15.
Jiang, Purdue University Graduate School Thesis/Dissertation Acceptance. Graduate School Form 30. Updated Jan. 15, 2015. 24 pages.
Kawaguchi et al., Estimation of Finger Joint Angles Based on Electromechanical Sensing of Wrist Shape. IEEE Transactions on Neural Systems and Rehabilitation Engineering. 2017;25(9):1409-18.
Kim et al., Real-Time Human Pose Estimation and Gesture Recognition from Depth Images Using Superpixels and SVM Classifier. Sensors. 2015;15:12410-27.
Koerner, Design and Characterization of the Exo-Skin Haptic Device: A Novel Tendon Actuated Textile Hand Exoskeleton. 2017. 5 pages.
Lee et al., Motion and Force Estimation System of Human Fingers. Journal of Institute of Control, Robotics and Systems. 2011;17(10):1014-1020.
Li et al., Motor Function Evaluation of Hemiplegic Upper-Extremities Using Data Fusion from Wearable Inertial and Surface EMG Sensors. Sensors. MDPI. 2017;17(582):1-17.
Lopes et al., Hand/arm gesture segmentation by motion using IMU and EMG sensing. ScienceDirect. Elsevier. Procedia Manufacturing. 2017;11:107-13.
Martin et al., A Novel Approach of Prosthetic Arm Control using Computer Vision, Biosignals, and Motion Capture. IEEE. 2014. 5 pages.
McIntee, A Task Model of Free-Space Movement-Based Gestures. Dissertation. Graduate Faculty of North Carolina State University. Computer Science. 2016. 129 pages.
Mendes et al., Sensor Fusion and Smart Sensor in Sports and Biomedical Applications. Sensors. 2016;16(1569):1-31.
Mohamed, Homogeneous cognitive based biometrics for static authentication. Dissertation submitted to University of Victoria, Canada. 2010. 149 pages. URL:http://hdl.handle.net/1828/3211 [last accessed Oct. 11, 2019].
Naik et al., Source Separation and Identification issues in bio signals: A solution using Blind source separation. Intech. 2009. 23 pages.
Naik et al., Subtle Hand gesture identification for HCI using Temporal Decorrelation Source Separation BSS of surface EMG. Digital Image Computing Techniques and Applications. IEEE Computer Society. 2007;30-7.
Negro et al., Multi-channel intramuscular and surface EMG decomposition by convolutive blind source separation. Journal of Neural Engineering. 2016;13:1-17.
Saponas et al., Demonstrating the Feasibility of Using Forearm Electromyography for Muscle-Computer Interfaces. CHI 2008 Proceedings. Phsiological Sensing for Input. 2008:515-24.
Saponas et al., Enabling Always-Available Input with Muscle-Computer Interfaces. UIST '09. 2009:167-76.
Saponas et al., Making Muscle-Computer Interfaces More Practical. CHI 2010: Brauns and Brawn. 2010:851-4.
Sartori et al., Neural Data-Driven Musculoskeletal Modeling for Personalized Neurorehabilitation Technologies. IEEE Transactions on Biomedical Engineering. 2016;63(5):879-93.
Sauras-Perez et al., A Voice and Pointing Gesture Interaction System for Supporting Human Spontaneous Decisions in Autonomous Cars. Clemson University. All Dissertations. 2017. 174 pages.

(56) References Cited

OTHER PUBLICATIONS

Shen et al., I am a Smartwatch and I can Track my User's Arm. University of Illinois at Urbana-Champaign. MobiSys' 16. 12 pages.
Son et al., Evaluating the utility of two gestural discomfort evaluation methods. PLOS One. 2017. 21 pages.
Strbac et al., Microsoft Kinect-Based Artificial Perception System for Control of Functional Electrical Stimulation Assisted Grasping. Hindawi Publishing Corporation. BioMed Research International. 2014. 13 pages.
Torres, Myo Gesture Control Armband. PCMag. Https://www.pcmag.com/article2/0,2817,2485462,00.asp 2015. 9 pages.
Valero-Cuevas et al., Computational Models for Neuromuscular Function. NIH Public Access Author Manuscript. Jun. 16, 2011. 52 pages.
Wodzinski et al., Sequential Classification of Palm Gestures Based on A* Algorithm and MLP Neural Network for Quadrocopter Control. Metrol. Meas. Syst., 2017:24(2):265-76.
Xue et al., Multiple Sensors Based Hand Motion Recognition Using Adaptive Directed Acyclic Graph. Applied Sciences. MDPI. 2017;7(358):1-14.
Yang et al., Surface EMG based handgrip force predictions using gene expression programming. Neurocomputing. 2016;207:568-579.
Costanza et al., "EMG as a Subtle Input Interface for Mobile Computing", Mobile HCI 2004, LNCS 3160, edited by S. Brewster and M. Dunlop, Springer-Verlag Berlin Heidelberg, pp. 426-430, 2004.
Costanza et al., "Toward Subtle Intimate Interfaces for Mobile Devices Using an EMG Controller", CHI 2005, Proceedings of the SIGCHI Conference on Human Factors in Computing Systems, pp. 481-489, 2005.
Ghasemzadeh et al., "A Body Sensor Network With Electromyogram and Inertial Sensors: Multimodal Interpretation of Muscular Activities", IEEE Transactions on Information Technology in Biomedicine, vol. 14, No. 2, pp. 198-206, Mar. 2010.
Gourmelon et al., "Contactless sensors for Surface Electromyography", Proceedings of the 28th IEEE EMBS Annual International Conference, New York City, NY, Aug. 30-Sep. 3, 2006, pp. 2514-2517.
International Search Report and Written Opinion, dated May 16, 2014, for corresponding International Application No. PCT/US2014/017799, 9 pages.
International Search Report and Written Opinion, dated Aug. 21, 2014, for corresponding International Application No. PCT/US2014/037863, 10 pages.
International Search Report and Written Opinion, dated Nov. 21, 2014, for corresponding International Application No. PCT/US2014/052143, 9 pages.
International Search Report and Written Opinion, dated Feb. 27, 2015, for corresponding International Application No. PCT/US2014/067443, 10 pages.
International Search Report and Written Opinion, dated May 27, 2015, for corresponding International Application No. PCT/US2015/015675, 9 pages.
Morris et al., "Emerging Input Technologies for Always-Available Mobile Interaction", Foundations and Trends in Human-Computer Interaction 4(4):245-316, 2010. (74 total pages).
Naik et al., "Real-Time Hand Gesture Identification for Human Computer Interaction Based on ICA of Surface Electromyogram", IADIS International Conference Interfaces and Human Computer Interaction, 2007, 8 pages.
Picard et al., "Affective Wearables", Proceedings of the IEEE 1st International Symposium on Wearable Computers, ISWC, Cambridge, MA, USA, Oct. 13-14, 1997, pp. 90-97.
Rekimoto, "Gesture Wrist and GesturePad: Unobtrusive Wearable Interaction Devices", ISWC '01 Proceedings of the 5th IEEE International Symposium on Wearable Computers, 2001, 7 pages.
Final Office Action received for U.S. Appl. No. 14/505,836 dated Jul. 28, 2017, 52 pages.
Sato et al., "Touche: Enhancing Touch Interaction on Humans, Screens, Liquids, and Everyday Objects", CHI' 12, May 5-10, 2012, Austin, Texas.
Ueno et al., "A Capacitive Sensor System for Measuring Laplacian Electromyogram through Cloth: A Pilot Study", Proceedings of the 29th Annual International Conference of the IEEE EMBS, Cite Internationale, Lyon, France, Aug. 23-26, 2007.
Ueno et al., "Feasibility of Capacitive Sensing of Surface Electromyographic Potential through Cloth", Sensors and Materials 24(6):335-346, 2012.
Xiong et al., "A Novel HCI based on EMG and IMU", Proceedings of the 2011 IEEE International Conference on Robotics and Biomimetics, Phuket, Thailand, Dec. 7-11, 2011, 5 pages.
Zhang et al., "A Framework for Hand Gesture Recognition Based on Accelerometer and EMG Sensors", IEEE Transactions on Systems, Man, and Cybernetics—Part A: Systems and Humans, vol. 41, No. 6, pp. 1064-1076, Nov. 2011.
Non-Final Office Action received for U.S. Appl. No. 14/505,836 dated Jun. 30, 2016, 37 pages.
Xu et al., "Hand Gesture Recognition and Virtual Game Control Based on 3D Accelerometer and EMG Sensors", Proceedings of the 14th international conference on Intelligent user interfaces, Sanibel Island, Florida, Feb. 8-11, 2009, pp. 401-406.
Communication pursuant to Rule 164(1) EPC, dated Sep. 30, 2016, for corresponding EP Application No. 14753949.8, 7 pages.
Non-Final Office Action received for U.S. Appl. No. 14/505,836 dated Feb. 23, 2017, 54 pages.
Brownlee, "Finite State Machines (FSM): Finite state machines as a control technique in Artificial Intelligence (AI)", Jun. 2002, 12 pages.
Kipke et al., Silicon-substrate Intracortical Microelectrode Arrays for Long-Term Recording of Neuronal Spike Activity in Cerebral Cortex. IEEE Transactions on Neural Systems and Rehabilitation Engineering. 2003; 11(2): 151-155.
Extended European Search Report received for EP Patent Application Serial No. 17835112.8 dated Feb. 5, 2020, 17 pages.
International Search Report and Written Opinion for International Application No. PCT/US2019/046351 dated Nov. 7, 2019.
Extended European Search Report for European Application No. EP 17835111.0 dated Nov. 21, 2019.
International Preliminary Report on Patentability received for PCT Application Serial No. PCT/US2014/017799 dated Sep. 3, 2015, 8 pages.
International Preliminary Report on Patentability received for PCT Application Serial No. PCT/US2014/037863 dated Nov. 26, 2015, 8 pages.
International Preliminary Report on Patentability received for PCT Application Serial No. PCT/US2014/052143 dated Mar. 3, 2016, 7 pages.
International Preliminary Report on Patentability received for PCT Application Serial No. PCT/US2014/067443 dated Jun. 9, 2016, 7 pages.
International Preliminary Report on Patentability received for PCT Application Serial No. PCT/US2015/015675 dated Aug. 25, 2016, 8 pages.
International Search Report and Written Opinion received for PCT Application Serial No. PCT/US2019/049094 dated Jan. 9, 2020, 27 pages.
Corazza et al., "A Markerless Motion Capture System to Study Musculoskeletal Biomechanics: Visual Hull and Simulated Annealing Approach", Annals of Biomedical Engineering, vol. 34, No. 6, Jul. 2006, pp. 1019-1029.
Non-Final Office Action received for U.S. Appl. No. 15/882,858 dated Oct. 30, 2019, 22 pages.
Non-Final Office Action received for U.S. Appl. No. 15/659,072 dated Apr. 30, 2019, 99 pages.
Final Office Action received for U.S. Appl. No. 15/659,072 dated Nov. 29, 2019, 36 pages.
Non-Final Office Action received for U.S. Appl. No. 16/353,998 dated May 24, 2019, 20 pages.
Final Office Action received for U.S. Appl. No. 16/353,998 dated Nov. 29, 2019, 33 pages.

(56) References Cited

OTHER PUBLICATIONS

Extended European Search Report for European Application No. EP 17835140.9 dated Nov. 26, 2019.
International Search Report and Written Opinion for International Application No. PCT/US2019/052131 dated Dec. 6, 2019.
Al-Mashhadany, Inverse Kinematics Problem (IKP) of 6-DOF Manipulator Bgy Locally Recurrent Neural Networks (LRNNs). Management and Service Science (MASS). 2010 International Conference ON, IEEE. Aug. 24, 2010. 5 pages. ISBN: 978-1-4244-5325-2.
Marcard et al., Sparse Inertial Poser: Automatic 3D Human Pose Estimation from Sparse IMUs. Eurographics. 2017;36(2). 12 pages.
Wittevrongel et al., Spatiotemporal Beamforming: A Transparent and Unified Decoding Approach to Synchronous Visual Brain-Computer Interfacing. Frontiers in Neuroscience. 2017;11:1-12.
Zacharaki et al., Spike pattern recognition by supervised classification in low dimensional embedding space. Brain Informatics. 2016;3:73-8. DOI: 10.1007/s40708-016-0044-4.
Final Office Action received for U.S. Appl. No. 16/557,342 dated Jan. 28, 2020, 15 pages.
Non-Final Office Action received for U.S. Appl. No. 16/557,427 dated Dec. 23, 2019, 52 pages.
Non-Final Office Action received for U.S. Appl. No. 16/557,383 dated Dec. 23, 2019, 53 pages.
Non-Final Office Action received for U.S. Appl. No. 16/577,207 dated Nov. 19, 2019, 32 pages.
Final Office Action received for U.S. Appl. No. 16/577,207 dated Feb. 4, 2020, 76 pages.
Non-Final Office Action received for U.S. Appl. No. 16/557,342 dated Oct. 22, 2019, 16 pages.
International Search Report and Written Opinion for International Application No. PCT/US2019/042579 dated Oct. 31, 2019.
International Search Report and Written Opinion for International Application No. PCT/US2019/015180 dated May 16, 2019.
Invitation to Pay Additional Fees for International Application No. PCT/US2019/049094 dated Oct. 24, 2019.
Non-Final Office Action received for U.S. Appl. No. 15/974,384 dated May 16, 2019, 13 pages.
Notice of Allowance received for U.S. Appl. No. 15/974,384 dated Nov. 4, 2019, 39 pages.
Berenzweig et al., "Wearable Devices and Methods for Improved Speech Recognition", U.S. Appl. No. 16/785,680, filed Feb. 10, 2020, 67 pages.
Non-Final Office Action received for U.S. Appl. No. 15/974,454 dated Dec. 20, 2019, 41 pages.
Final Office Action received for U.S. Appl. No. 15/974,454 dated Apr. 9, 2020, 19 pages.
International Search Report and Written Opinion received for PCT Application Serial No. PCT/US2019/031114 dated Dec. 20, 2019, 18 pages.
Non-Final Office Action received for U.S. Appl. No. 15/816,435 dated Jan. 22, 2020, 35 pages.
Non-Final Office Action received for U.S. Appl. No. 15/882,858 dated Sep. 2, 2020, 66 pages.
Non-Final Office Action received for U.S. Appl. No. 15/974,454 dated Aug. 20, 2020, 59 pages.
Notice of Allowance received for U.S. Appl. No. 16/557,427 dated Aug. 19, 2020, 22 pages.
Final Office Action received for U.S. Appl. No. 15/882,858 dated Jun. 2, 2020, 127 pages.
Non-Final Office Action received for U.S. Appl. No. 15/659,072 dated Jun. 5, 2020, 59 pages.
Non-Final Office Action received for U.S. Appl. No. 16/353,998 dated May 26, 2020, 60 pages.
Final Office Action received for U.S. Appl. No. 16/557,383 dated Jun. 2, 2020, 66 pages.
Final Office Action received for U.S. Appl. No. 16/557,427 dated Jun. 5, 2020, 95 pages.
Preinterview First Office Action received for U.S. Appl. No. 16/785,680 dated Jun. 24, 2020, 90 pages.
Non-Final Office Action received for U.S. Appl. No. 16/557,342 dated Jun. 15, 2020, 46 pages.
Notice of Allowance received for U.S. Appl. No. 15/659,072 dated Dec. 23, 2020, 26 pages.
Notice of Allowance received for U.S. Appl. No. 15/974,454 dated Nov. 2, 2020, 24 pages.
Final Office Action received for U.S. Appl. No. 16/557,342 dated Oct. 8, 2020, 27 pages.
Final Office Action received for U.S. Appl. No. 15/816,435 dated Sep. 23, 2020, 70 pages.
Non-Final Office Action received for U.S. Appl. No. 16/577,207 dated Oct. 8, 2020, 51 pages.
Final Office Action received for U.S. Appl. No. 16/577,207 dated Jan. 13, 2021, 91 pages.
Partial Supplementary Search Report received for EP Patent Application Serial No. 18879156.0 dated Dec. 7, 2020, 10 pages.
Communication Pursuant to Article 94(3) EPC received for EP Patent Application Serial No. 17835112.8 dated Dec. 14, 2020, 6 pages.
Final Office Action received for U.S. Appl. No. 15/882,858 dated Feb. 4, 2021, 42 pages.
Non-Final Office Action received for U.S. Appl. No. 16/557,342 dated Feb. 8, 2021, 11 pages.
Extended European Search Report received for EP Patent Application Serial No. 19799947.7 dated May 26, 2021, 11 pages.
Cannan et al., "A wearable sensor fusion armband for simple motion control and selection for disabled and non-disabled users", 4th Computer Science and Electronic Engineering Conference, IEEE, Sep. 12, 2012, pp. 216-219.
Non-Final Office Action received for U.S. Appl. No. 15/816,435 dated Jun. 3, 2021, 32 pages.
European Search Report for European Application No. 19863248.1, dated Oct. 19, 2021, 2 pages.
Fong H.C., et al., "PepperGram With Interactive Control," 22nd International Conference Onvirtual System & Multimedia (VSMM), Oct. 17, 2016, 5 pages.
Marcard T.V., et al., "Sparse Inertial Poser: Automatic 3D Human Pose Estimation from Sparse IMUs," arxiv.org, Computer Graphics Forum, 2017, vol. 36 (2), 12 pages, XP080759137.
Non-Final Office Action dated Aug. 11, 2021 for U.S. Appl. No. 16/577,207, filed Sep. 20, 2019, 35 Pages.

\* cited by examiner

SYSTEMS AND METHODS FOR IMPROVED SPEECH RECOGNITION USING NEUROMUSCULAR INFORMATION

BACKGROUND

Automated speech recognition systems transform recorded audio including speech into recognized text. The speech recognition systems convert the input audio into text using one or more acoustic or language models that represent the mapping from audio input to text output using language-based constructs such as phonemes, syllables, or words. The models used for speech recognition may be speaker independent or speaker dependent and may be trained or refined for use by a particular user as the user uses the system and feedback is provided to retrain the models. Increased usage of the system by the particular user typically results in improvements to the accuracy and/or speed by which the system is able to produce speech recognition results as the system learns the user's speech characteristics and style.

SUMMARY

Systems and methods are described herein for providing an improved speech recognition system in which speech data provided as input to the system is augmented with neuromuscular signals (e.g., recorded using electromyography (EMG)). The improved speech recognition system may exhibit better performance (e.g., accuracy, speed) compared to speech recognition systems that receive only speech data as input. For example, a musculo-skeletal representation (including, but not limited to, body position information and biophysical quantities such as motor unit and muscle activation levels and forces) determined based on the neuromuscular signals may encode contextual information represented in a user's movements or activation of their muscles, that may be used to enhance speech recognition performance. In another example, the described systems and methods may interpret parts of speech from the user's movements or activations to enhance speech recognition performance. In some embodiments, the described systems and methods provide for modifying an operation of a speech recognition system (e.g., by enabling and disabling speech recognition with a wake word/phrase or gesture, applying formatting such as bold, italics, underline, indent, etc., entering punctuation, and other suitable modifications). In some embodiments, the described systems and methods provide for using recognized neuromuscular information, e.g., for one or more gestures, to change an interaction mode (e.g., dictation, spelling, editing, navigation, or another suitable mode) with the speech recognition system or speech recognizer. In some embodiments, the described systems and methods provide for using EMG-based approaches (e.g. EMG-based scrolling and clicking) to select text for editing, error corrections, copying, pasting, or another suitable purpose. In some embodiments, the described systems and methods provide for selection of options from list of choices, e.g., with audio feedback for "eyes-busy" situations like driving ("did you mean X or Y?"). In some embodiments, the described systems and methods provide for a hybrid neuromuscular/speech input that gracefully switches from one mode to the other, and uses both modes when available to increase accuracy and speed. In some embodiments, the described systems and methods provide for text input using a linguistic token, such as phonemes, characters, syllables, words, sentences, or another suitable linguistic token, as the basic unit of recognition.

Some embodiments are directed to a system for using neuromuscular information to improve speech recognition. The system includes a plurality of neuromuscular sensors arranged on one or more wearable devices. The plurality of neuromuscular sensors is configured to continuously record a plurality of neuromuscular signals from a user. The system further includes at least one storage device configured to store one or more trained statistical models and at least one computer processor. The computer processor is programmed to provide as an input to the one or more trained statistical models. The plurality of neuromuscular signals or signals are derived from the plurality of neuromuscular signals. The computer processor is further programmed to determine based, at least in part, on an output of the one or more trained statistical models, at least one instruction for modifying an operation of a speech recognizer and provide the at least one instruction to the speech recognizer. In some embodiments, the instruction for modifying the operation of the speech recognizer is determined directly from the plurality of neuromuscular signals. For example, the instruction may be output from a trained statistical model after applying the plurality of neuromuscular signals as inputs to the trained statistical model. In some embodiments, a musculo-skeletal representation of the user is determined based on the output of the one or more trained statistical models, and the instruction for modifying the operation of the speech recognizer is determined based on the musculo-skeletal representation.

Some embodiments are directed to a system for using neuromuscular information to improve speech recognition. The system includes a plurality of neuromuscular sensors arranged on one or more wearable devices. The plurality of neuromuscular sensors is configured to continuously record a plurality of neuromuscular signals from a user. The system further includes at least one storage device configured to store one or more trained statistical models for determining text based on the audio input and the plurality of neuromuscular signals. The system further includes at least one input interface configured to receive the audio input and at least one computer processor. The computer processor is programmed to obtain the audio input from the input interface and obtain the plurality of neuromuscular signals from the plurality of neuromuscular sensors. The computer processor is further programmed to provide as input to the one or more trained statistical models, the audio input and the plurality of neuromuscular signals or signals derived from the plurality of neuromuscular signals. The computer processor is further programmed to determine the text based, at least in part, on an output of the one or more trained statistical models.

Some embodiments are directed to a system for text input based on neuromuscular information. The system includes a plurality of neuromuscular sensors arranged on one or more wearable devices. The plurality of neuromuscular sensors is configured to continuously record a plurality of neuromuscular signals from a user. The system further includes at least one storage device configured to store one or more trained statistical models and at least one computer processor. The computer processor is programmed to obtain the plurality of neuromuscular signals from the plurality of neuromuscular sensors and provide the plurality of neuromuscular signals, or signals derived from the plurality of neuromuscular signals, as input to the one or more trained statistical models. The computer processor is further programmed to determine one or more linguistic tokens based, at least in part, on an output of the one or more trained statistical models.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

DETAILED DESCRIPTION

Figure 1:
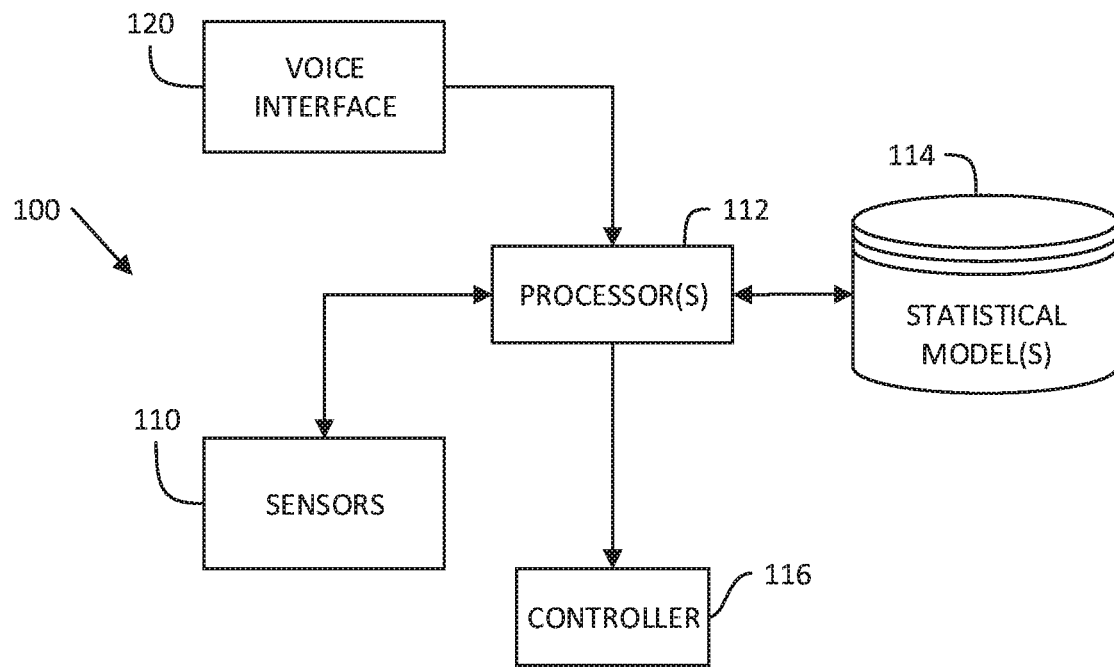
FIG. 1 is a schematic diagram of a computer-based system for using neuromuscular information to improve speech recognition in accordance with some embodiments of the technology described herein.

Automated speech recognition (ASR) is a computer-implemented process for converting speech to text using mappings between acoustic features extracted from input speech and language-based representations such as phonemes. Some ASR systems take as input, information other than speech to improve the performance of the ASR system. For example, an ASR system may take as input both visual information (e.g., images of a user's face) and audio information (e.g., speech) and may determine a speech recognition result based one or both of the types of inputs.

The inventors have recognized and appreciated that existing techniques for performing speech recognition may be improved by using musculo-skeletal information about the position and/or movement of a user's body (including, but not limited to, the user's arm, wrist, hand, neck, throat, tongue, or face) derived from recorded neuromuscular signals to augment the analysis of received audio when performing speech recognition.

The human musculo-skeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, a multi-segment articulated rigid body system is used to model the human musculo-skeletal system. However, it should be appreciated that some segments of the human musculo-skeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the arm may be modeled as a two-segment articulated rigid body with an upper portion corresponding to the upper arm connected at a shoulder joint to the torso of the body and a lower portion corresponding to the forearm, wherein the two segments are connected at the elbow joint. As another example, the hand may be modeled as a multi-segment articulated body with the joints in the wrist and each finger forming the interfaces between the multiple segments in the model. In some embodiments, movements of the segments in the rigid body model can be simulated as an articulated rigid body system in which orientation and position information of a segment relative to other segments in the model are predicted using a trained statistical model, as described in more detail below.

FIG. 1 illustrates a system 100 in accordance with some embodiments. The system includes a plurality of autonomous sensors 110 configured to record signals resulting from the movement of portions of a human body (including, but not limited to, the user's arm, wrist, hand, neck, throat, tongue, or face). As used herein, the term "autonomous sensors" refers to sensors configured to measure the movement of body segments without requiring the use of external sensors, examples of which include, but are not limited to, cameras or global positioning systems. Autonomous sensors 110 may include one or more Inertial Measurement Units (IMUs), which measure a combination of physical aspects of motion, using, for example, an accelerometer and a gyroscope. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso (e.g., arms, legs) as the user moves over time.

Autonomous sensors 110 may also include a plurality of neuromuscular sensors configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) describing the movement (e.g., for portions of the user's body distal to the user's torso, such as hands and feet) may be predicted based on the sensed neuromuscular signals as the user moves over time.

In embodiments that include at least one IMU and a plurality of neuromuscular sensors, the IMU(s) and neuromuscular sensors may be arranged to detect movement or activation of different parts of the human body (including, but not limited to, the user's arm, wrist, hand, neck, throat, tongue, or face). For example, the IMU(s) may be arranged to detect movements of one or more body segments proximal to the torso, whereas the neuromuscular sensors may be arranged to detect movements of one or more body segments distal to the torso. It should be appreciated, however, that autonomous sensors 110 may be arranged in any suitable way, and embodiments of the technology described herein are not limited based on the particular sensor arrangement. For example, in some embodiments, at least one IMU and a plurality of neuromuscular sensors may be co-located on a body segment to track movements of body segment using different types of measurements. In one implementation, an IMU sensor and a plurality of EMG sensors are arranged on a wearable device configured to be worn around the user's neck and/or proximate to the user's face. In one implementation described in more detail below, an IMU sensor and a plurality of EMG sensors are arranged on a wearable device configured to be worn around the lower arm or wrist of a user. In such an arrangement, the IMU sensor may be configured to track movement or activation information (e.g., positioning and/or orientation over time) associated with one or more arm segments, to determine, for example whether the user has raised or lowered their arm, whereas the EMG sensors may be configured to determine movement or activation information associated with wrist or hand segments to determine, for example, whether the user has an open or closed hand configuration.

Each of autonomous sensors 110 includes one or more sensing components configured to sense movement information or activation information from the user. The movement or activation sensed by the autonomous sensors 110 may correspond to muscle activation at a fixed point in time (e.g., the user making a thumbs up gesture or tensing arm muscles) or may correspond to the user performing a movement over a period of time (e.g., the user moving their arm in an arc). The autonomous sensors 110 may sense movement information when the user performs a movement, such as a gesture, a movement of a portion of the user's body (including, but not limited to, the user's arm, wrist, hand, neck, throat, tongue, or face), or another suitable movement. The autonomous sensors 110 may sense activation information when the user performs an activation, such as forces applied to external objects without movement, balanced forces (co-contraction), activation of individual muscle fibers (e.g., muscle fibers too weak to cause noticeable movement), or another suitable activation. In the case of IMUs, the sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, the output of one or more of the sensing components may be processed using hardware signal processing circuitry (e.g., to perform amplification, filtering, and/or rectification). In other embodiments, at least some signal processing of the output of the sensing components may be performed in software. Thus, signal processing of autonomous signals recorded by autonomous sensors 110 may be performed in hardware, software, or by any suitable combination of hardware and software, as aspects of the technology described herein are not limited in this respect.

In some embodiments, the recorded sensor data may be processed to compute additional derived measurements that are then provided as input to a statistical model, as described in more detail below. For example, recorded signals from an IMU sensor may be processed to derive an orientation signal that specifies the orientation of a rigid body segment over time. Autonomous sensors 110 may implement signal processing using components integrated with the sensing components, or at least a portion of the signal processing may be performed by one or more components in communication with, but not directly integrated with the sensing components of the autonomous sensors.

In some embodiments, at least some of the plurality of autonomous sensors 110 are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively or additionally, at least some of the autonomous sensors may be arranged on a wearable patch configured to be affixed to a portion of the user's body.

Figure 6:
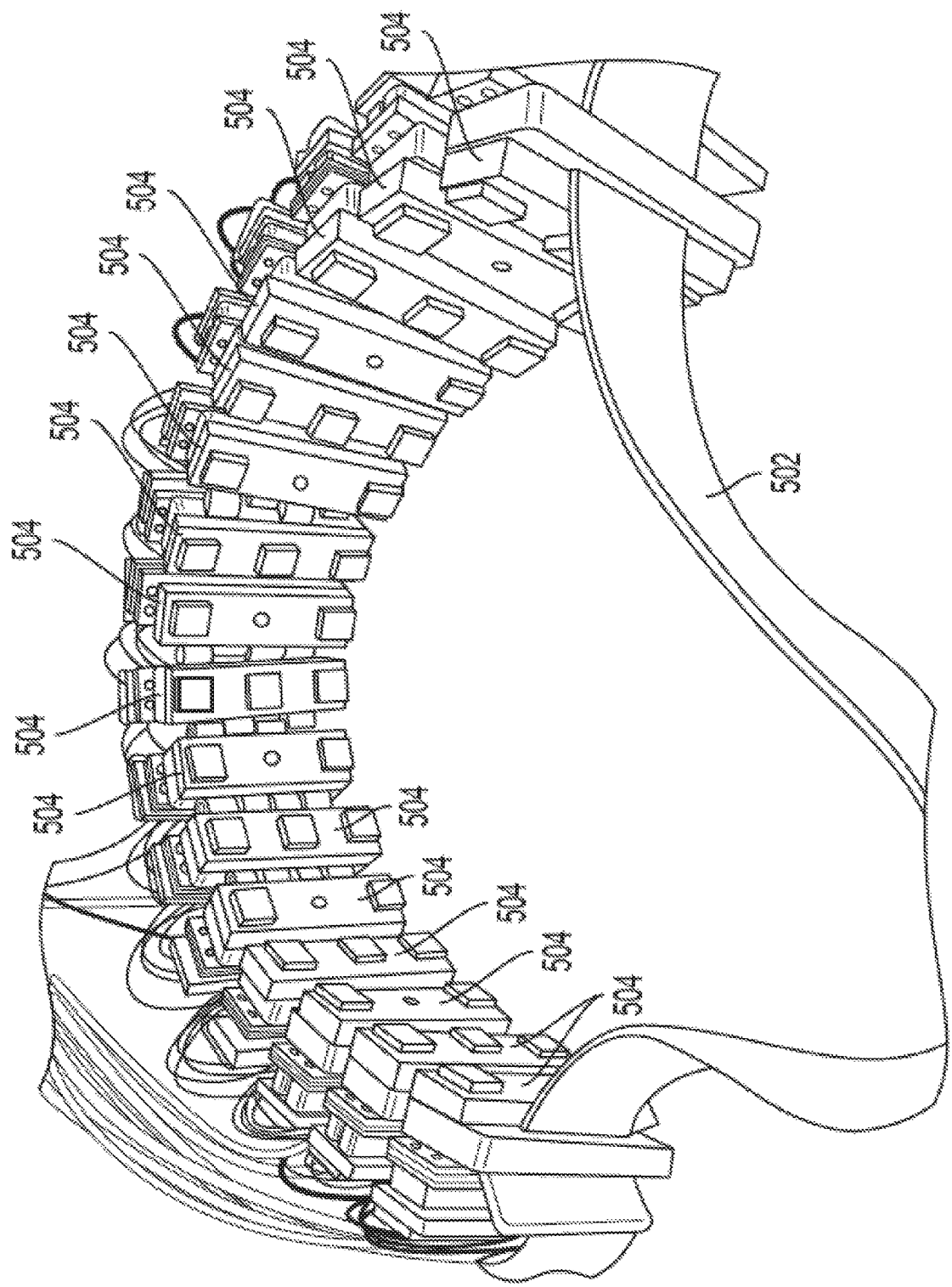
FIG. 6 illustrates a wristband having EMG sensors arranged circumferentially thereon, in accordance with some embodiments of the technology described herein.
Figure 7:
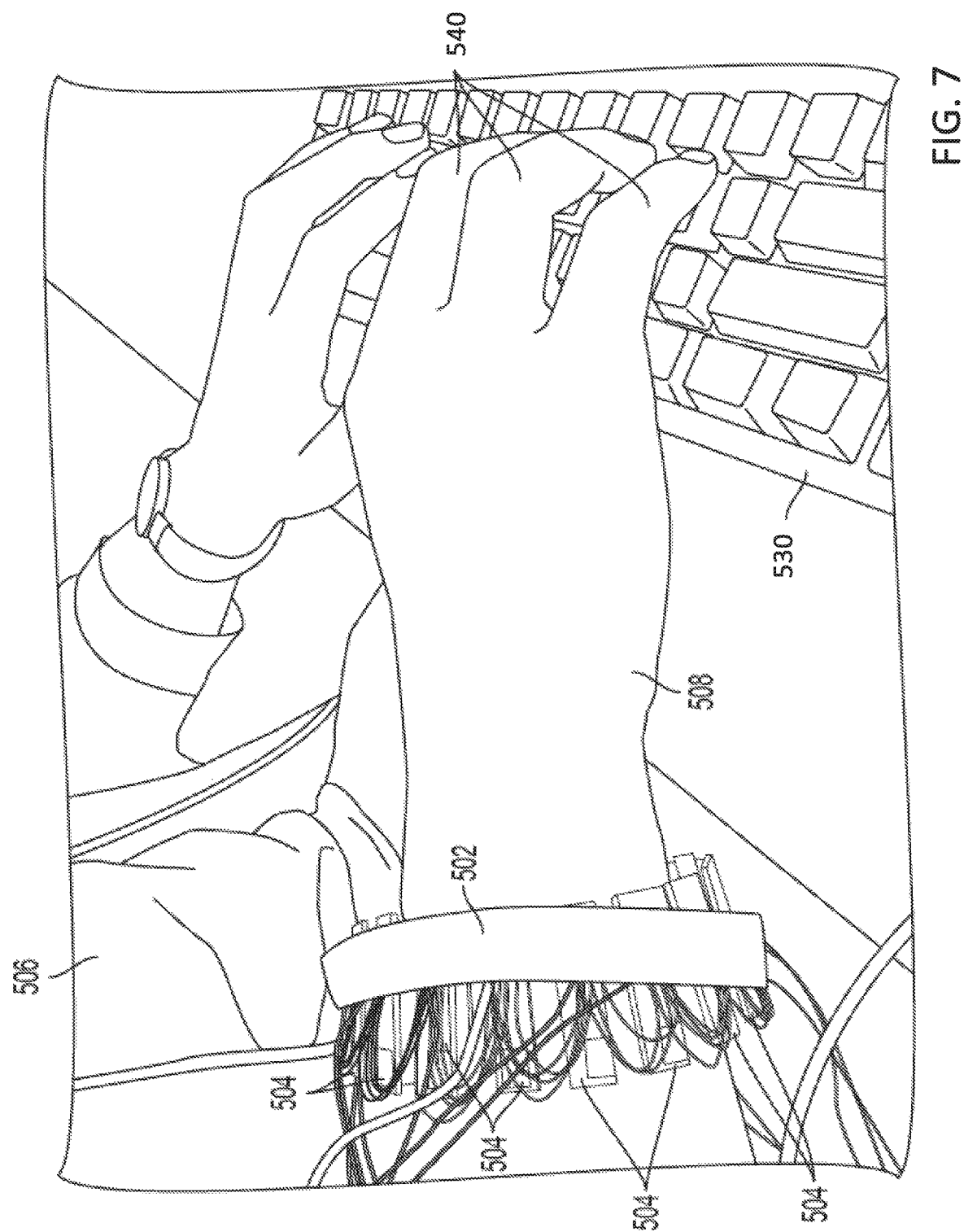
FIG. 7 illustrates a user wearing the wristband of FIG. 6 while typing on a keyboard, in accordance with some embodiments of the technology described herein.

In one implementation, 16 EMG sensors are arranged circumferentially around an elastic band configured to be worn around a user's lower arm. For example, FIG. 6 shows EMG sensors 504 arranged circumferentially around elastic band 502. It should be appreciated that any suitable number of neuromuscular sensors may be used and the number and arrangement of neuromuscular sensors used may depend on the particular application for which the wearable device is used. For example, a wearable armband or wristband may be used to predict musculo-skeletal position information for hand-based motor tasks, whereas a wearable leg or ankle band may be used to predict musculo-skeletal position information for foot-based motor tasks. For example, as shown in FIG. 7, a user 506 may be wearing elastic band 502 on hand 508. In this way, EMG sensors 504 may be configured to record EMG signals as a user controls keyboard 510 using fingers 512. In some embodiments, elastic band 502 may also include one or more IMUs (not shown), configured to record movement or activation information, as discussed above.

In some embodiments, multiple wearable devices, each having one or more IMUs and/or neuromuscular sensors included thereon may be used to predict musculo-skeletal position information for movements that involve multiple parts of the body.

System 100 also includes voice interface 120 configured to receive audio input. For example, voice interface 120 may include a microphone that, when activated, receives speech data, and processor(s) 112 may perform automatic speech recognition (ASR) based on the speech data. Audio input including speech data may be processed by an ASR system, which converts audio input to recognized text. The received speech data may be stored in a datastore (e.g., local or remote storage) associated with system 100 to facilitate the ASR processing. In some embodiments, ASR processing may be performed in whole or in part by one or more computers (e.g., a server) remotely located from voice interface 120. For example, in some embodiments, speech recognition may be performed locally using an embedded ASR engine associated with voice interface 120, a remote ASR engine in network communication with voice interface 120 via one or more networks, or speech recognition may be performed using a distributed ASR system including both embedded and remote components. Additionally, it should be appreciated that computing resources used in accordance with the ASR engine may also be located remotely from voice interface 120 to facilitate the ASR processing described herein, as aspects of the invention related to ASR processing are not limited in any way based on the particular implementation or arrangement of these components within system 100.

System 100 also includes one or more computer processor(s) 112 programmed to communicate with autonomous sensors 110 and/or voice interface 120. For example, signals recorded by one or more of the autonomous sensors 110 may be provided to processor(s) 112, which may be programmed to perform signal processing, non-limiting examples of which are described above. In another example, speech data recorded by voice interface 120 may be provided to processor(s) 112, which may be programmed to perform automatic speech recognition, non-limiting examples of which are described above. Processor(s) 112 may be implemented in hardware, firmware, software, or any combination thereof. Additionally, processor(s) 112 may be co-located on a same wearable device as one or more of the autonomous sensors or the voice interface or may be at least partially located remotely (e.g., processing may occur on one or more network-connected processors).

System 100 also includes datastore 114 in communication with processor(s) 112. Datastore 114 may include one or more storage devices configured to store information describing a statistical model used for predicting musculo-skeletal position information based on signals recorded by autonomous sensors 110 in accordance with some embodiments. Processor(s) 112 may be configured to execute one or more machine learning algorithms that process signals output by the autonomous sensors 110 to train a statistical model stored in datastore 114, and the trained (or retrained) statistical model may be stored in datastore 114 for later use in generating a musculo-skeletal representation. Non-limiting examples of statistical models that may be used in accordance with some embodiments to predict musculo-skeletal position information based on recorded signals from autonomous sensors are discussed in more detail below.

In some embodiments, a set of training data, including sensor data from the autonomous sensors 110 and/or speech data from the voice interface 120, is obtained for training the statistical model. This training data may also be referred to as ground truth data. The training data may be obtained by prompting the user at certain times to perform a movement or activation and capturing the corresponding sensor data and/or speech data. Alternatively or additionally, the training data may be captured when the user is using a device, such as a keyboard. For example, the captured training data may include the user's EMG signal data and the user's corresponding key presses from a key logger. Alternatively or additionally, the training data may include ground truth joint angles corresponding to the user's movement or activation. The ground truth joint angles may be captured using, e.g., a camera device, while the user performs the movement or activation. Alternatively or additionally, the training data may include sensor data corresponding to a movement or activation performed by the user and annotated with speech data corresponding to the user speaking at the same time as performing the movement or activation. For example, the user may perform a gesture, such as a thumbs up gesture, and speak a word, such as "edit," to indicate that the gesture relates to an edit function. Alternatively or additionally, the training data may be captured when the user is using a writing implement or instrument, such as a pen, a pencil, a stylus, or another suitable writing implement or instrument. For example, the captured training data may include EMG signal data recorded when the user is prompted to write one or more characters, words, shorthand symbols, and/or another suitable written input using a pen. Optionally, the motion of the writing implement or instrument may be recorded as the user writes. For example, an electronic stylus (or another device configured to record motion) may record motion of the electronic stylus as the user writes a prompted word using the electronic stylus. Accordingly, the captured training data may include recorded EMG signal data and the corresponding recorded motion of the writing implement or instrument as the user writes one or more letters, words, shorthand symbols, and/or another suitable written input using the writing implement or instrument.

In some embodiments, processor(s) 112 may be configured to communicate with one or more of autonomous sensors 110, for example, to calibrate the sensors prior to measurement of movement or activation information. For example, a wearable device may be positioned in different orientations on or around a part of a user's body and calibration may be performed to determine the orientation of the wearable device and/or to perform any other suitable calibration tasks. Calibration of autonomous sensors 110 may be performed in any suitable way, and embodiments are not limited in this respect. For example, in some embodiments, a user may be instructed to perform a particular sequence of movements or activations and the recorded movement or activation information may be matched to a template by virtually rotating and/or scaling the signals detected by the sensors (e.g., by the electrodes on EMG sensors). In some embodiments, calibration may involve changing the gain(s) of one or more analog to digital converters (ADCs), for example, in the case that the signals detected by the sensors result in saturation of the ADCs.

System 100 optionally includes one or more controllers 116 configured to receive a control signal based, at least in part, on processing by processor(s) 112. As discussed in more detail below, processor(s) 112 may implement one or more trained statistical models 114 configured to predict musculo-skeletal position information based, at least in part, on signals recorded by autonomous sensors 110 worn by a user. One or more control signals determined based on the output of the trained statistical model(s) may be sent to controller 116 to control one or more operations of a device associated with the controller. In some embodiments, system 100 does not include one or more controllers configured to control a device. In such embodiments, data output as a result of processing by processor(s) 112 (e.g., using trained statistical model(s) 114) may be stored for future use or transmitted to another application or user.

In some embodiments, during real-time tracking, information sensed from a single armband/wristband wearable device that includes at least one IMU and a plurality of neuromuscular sensors is used to reconstruct body movements, such as reconstructing the position and orientation of both the forearm, upper arm, wrist and hand relative to a torso reference frame using a single arm/wrist-worn device, and without the use of external devices or position determining systems. For brevity, determining both position and orientation may also be referred to herein generally as determining movement.

As discussed above, some embodiments are directed to using a statistical model for predicting musculo-skeletal position information based on signals recorded from wearable autonomous sensors. The statistical model may be used to predict the musculo-skeletal position information without having to place sensors on each segment of the rigid body that is to be represented in a computer-generated musculo-skeletal representation of user's body. As discussed briefly above, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into statistical models used for prediction in accordance with some embodiments. Additionally or alternatively, the constraints may be learned by the statistical model through training based on recorded sensor data. Constraints imposed in the construction of the statistical model are those set by anatomy and the physics of a user's body, while constraints derived from statistical patterns are those set by human behavior for one or more users from which sensor measurements are measured. As described in more detail below, the constraints may comprise part of the statistical model itself being represented by information (e.g., connection weights between nodes) in the model.

In some embodiments, system 100 may be trained to predict musculo-skeletal position information as a user moves or activates muscle fibers. In some embodiments, the system 100 may be trained by recording signals from autonomous sensors 110 (e.g., IMU sensors, EMG sensors) and position information recorded from position sensors worn by one or more users as the user(s) perform one or more movements. The position sensors, described in more detail below, may measure the position of each of a plurality of spatial locations on the user's body as the one or more movements are performed during training to determine the actual position of the body segments. After such training, the system 100 may be configured to predict, based on a particular user's autonomous sensor signals, musculo-skeletal position information (e.g., a set of joint angles) that enable the generation of a musculo-skeletal representation without the use of the position sensors.

As discussed above, some embodiments are directed to using a statistical model for predicting musculo-skeletal position information to enable the generation of a computer-based musculo-skeletal representation. The statistical model may be used to predict the musculo-skeletal position information based on IMU signals, neuromuscular signals (e.g., EMG, MMG, and SMG signals), or a combination of IMU signals and neuromuscular signals detected as a user performs one or more movements.

Figure 2:
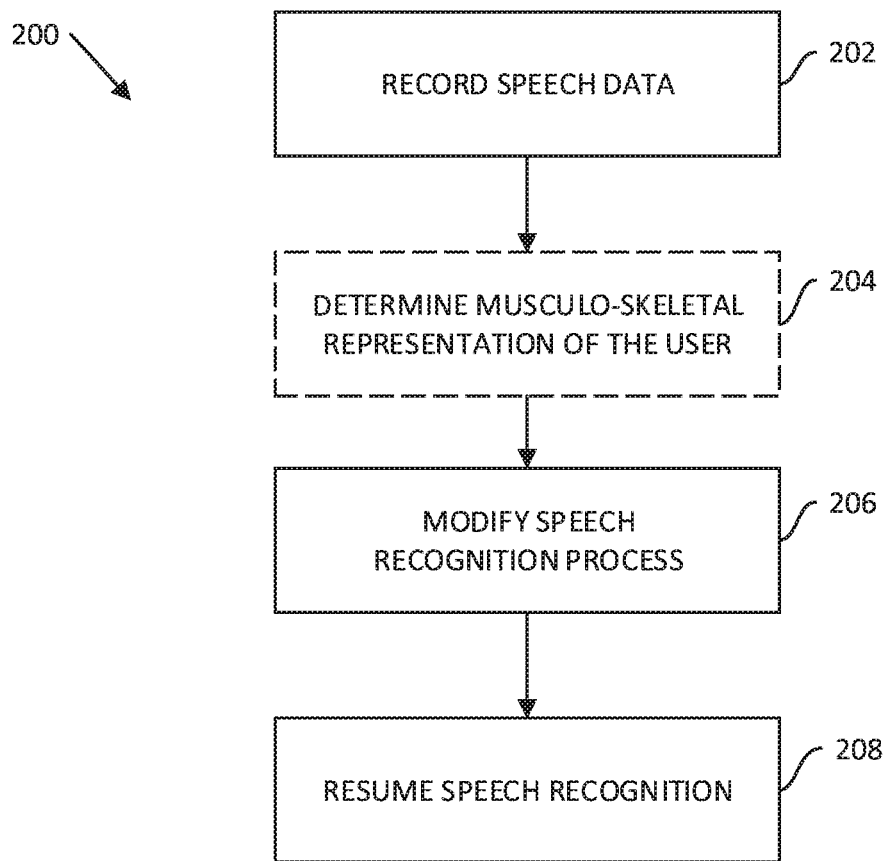
FIG. 2 is a flowchart of an illustrative process for using neuromuscular information to improve speech recognition, in accordance with some embodiments of the technology described herein.

FIG. 2 describes a process 200 for using neuromuscular information to improve speech recognition. Process 200 may be executed by any suitable computing device(s), as aspects of the technology described herein are not limited in this respect. For example, process 200 may be executed by processor(s) 112 described with reference to FIG. 1. As another example, one or more acts of process 200 may be executed using one or more servers (e.g., servers included as a part of a cloud computing environment). For example, at least a portion of act 204 relating to determining a musculo-skeletal representation of the user may be performed using a cloud computing environment. Although process 200 is described herein with respect to processing IMU and EMG signals, it should be appreciated that process 200 may be used to predict neuromuscular information based on any recorded autonomous signals including, but not limited to, IMU signals, EMG signals, MMG signals, SMG signals, or any suitable combination thereof and a trained statistical model trained on such autonomous signals.

Process 200 begins at act 202, where speech data is obtained for one or multiple users from voice interface 120. For example, voice interface 120 may include a microphone that samples audio input at a particular sampling rate (e.g., 16 kHz), and recording speech data in act 202 may include sampling audio input by the microphone. Sensor data for a plurality of neuromuscular signals may be obtained from sensors 110 in parallel, prior to, or subsequent to obtaining the speech data from voice interface 120. For example, speech data corresponding to a word from the user may obtained at the same time as sensor data corresponding to a gesture from the user to change the formatting of the word. In another example, speech data corresponding to a word from the user may obtained, and at a later time, sensor data may be obtained corresponding to a gesture from the user to delete the word. In yet another example, sensor data may be obtained corresponding to a gesture from the user to change the formatting for text output in the future, and at a later time, speech data corresponding to a word from the user may obtained and formatted accordingly. Optionally, process 200 proceeds to act 204, where the plurality of neuromuscular signals from sensors 110, or signals derived from the plurality of neuromuscular signals, are provided as input to one or more trained statistical models and a musculo-skeletal representation of the user is determined based, at least in part, on an output of the one or more trained statistical models.

In some embodiments, signals are recorded from a plurality of autonomous sensors arranged on or near the surface of a user's body to record activity associated with movements or activations of the body during performance of a task. In one example, the autonomous sensors comprise an IMU sensor and a plurality of EMG sensors arranged circumferentially (or otherwise oriented) on a wearable device configured to be worn on or around a part of the user's body, such as the user's arm. In some embodiments, the plurality of EMG signals are recorded continuously as a user wears the wearable device including the plurality of autonomous sensors.

In some embodiments, the signals recorded by the autonomous sensors are optionally processed. For example, the signals may be processed using amplification, filtering, rectification, or other types of signal processing. In some embodiments, filtering includes temporal filtering implemented using convolution operations and/or equivalent operations in the frequency domain (e.g., after the application of a discrete Fourier transform). In some embodiments, the signals are processed and used as training data to train the statistical model.

In some embodiments, the autonomous sensor signals are provided as input to a statistical model (e.g., a neural network) trained using any suitable number of layers and any suitable number of nodes in each layer. In some embodiments that continuously record autonomous signals, the continuously recorded autonomous signals (raw or processed) may be continuously or periodically provided as input to the trained statistical model for prediction of a musculo-skeletal representation for the given set of input sensor data. In some embodiments, the trained statistical model is a user-independent model trained based on autonomous sensor and position information measurements from a plurality of users. In other embodiments, the trained model is a user-dependent model trained on data recorded from the individual user from which the data recorded in act 204 is also acquired.

In some embodiments, after the trained statistical model receives the sensor data as a set of input parameters, a predicted musculo-skeletal representation is output from the trained statistical model. In some embodiments, the predicted musculo-skeletal representation may comprise a set of body position information values (e.g., a set of joint angles) for a multi-segment articulated rigid body model representing at least a portion of the user's body. In other embodiments, the musculo-skeletal representation may comprise a set of probabilities that the user is performing one or more movements or activations from a set of possible movements or activations.

Next, process 200 proceeds to act 206, where an instruction for modifying an operation of a speech recognizer is determined, and the instruction is provided to the speech recognizer. In embodiments where process 200 does not include act 204 the instruction for modifying the operation of the speech recognizer is determined based, at least in part, on an output of the one or more trained statistical models. For example, the one or more trained statistical models may directly map sensor data, e.g., EMG signal data, to the instruction for modifying the operation of the speech recognizer. In embodiments where process 200 includes act 204, the instruction for modifying the operation of the speech recognizer is determined based on the musculo-skeletal representation determined in act 204. In some embodiments, process 200 modifies the speech recognition process. For example, process 200 may modify at least a portion of text output from the speech recognizer, where the modification may relate to punctuation, spelling, formatting, or another suitable modification of the text. In another example, process 200 may change a caps lock mode of the speech recognizer. In yet another example, process 200 may change a language mode of the speech recognizer. For example, the speech recognizer may be instructed to change from recognizing English to recognizing French. Some embodiments include a communications interface configured to provide the instruction from a processor, e.g., processor(s) 112, to the speech recognizer. In some embodiments, a processor, e.g., processor(s) 112, is programmed to execute the speech recognizer. Process 200 proceeds to step 208, where speech recognition is resumed, e.g., for speech data recorded at act 202 or other suitable audio input.

Figure 3:
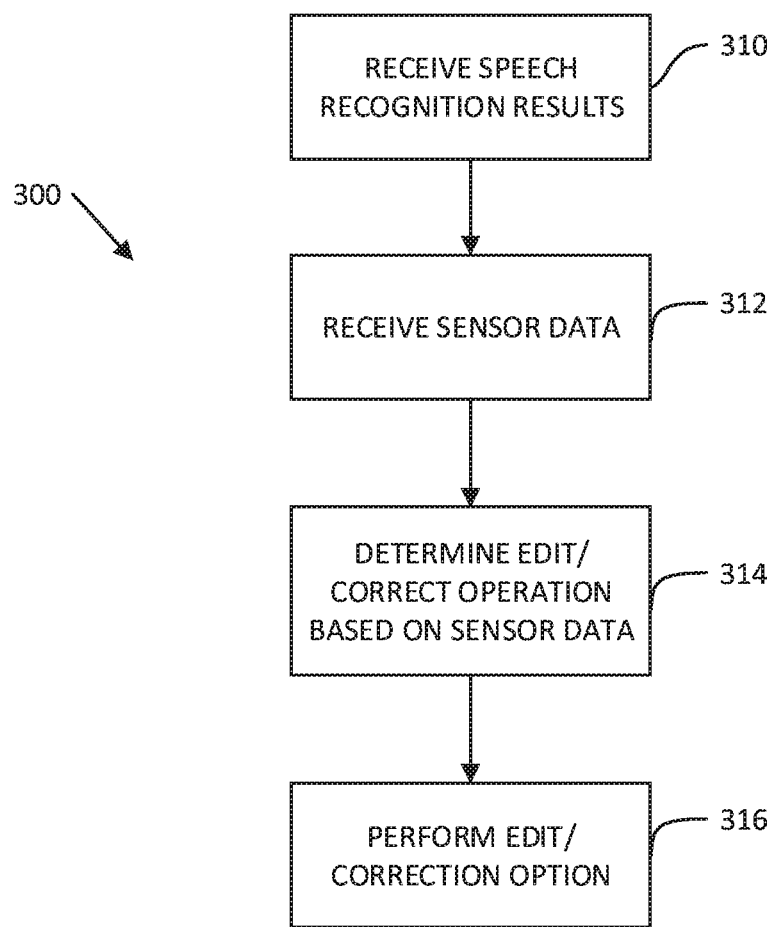
FIG. 3 is a flowchart of another illustrative process for using neuromuscular information to improve speech recognition, in accordance with some embodiments of the technology described herein.

FIG. 3 describes a process 300 for using neuromuscular information to improve speech recognition. Process 300 may be executed by any suitable computing device(s), as aspects of the technology described herein are not limited in this respect. For example, process 300 may be executed by processor(s) 112 described with reference to FIG. 1. As another example, one or more acts of process 300 may be executed using one or more servers (e.g., servers included as a part of a cloud computing environment). For example, at least a portion of act 314 relating to determining an edit and/or correct operation based on sensor data may be performed using a cloud computing environment. Although process 300 is described herein with respect to IMU and EMG signals, it should be appreciated that process 300 may be used to predict neuromuscular information based on any recorded autonomous signals including, but not limited to, IMU signals, EMG signals, MMG signals, SMG signals, or any suitable combination thereof and a trained statistical model trained on such autonomous signals.

Process 300 begins at act 310, where speech recognition results are obtained, e.g., from speech data received from voice interface 120. In some embodiments, processor(s) 112 may perform ASR based on the speech data to generate the speed recognition results. In some embodiments, audio input including speech data may be processed by an ASR system, which produces speech recognition results by converting audio input to recognized text. The received speech data may be stored in a datastore (e.g., local or remote storage) associated with system 100 to facilitate the ASR processing.

Next, at act 312, sensor data is received, for example, from sensors 110. The sensor data may be recorded and processed as described with respect to the process of FIG. 2. The sensor data may include a plurality of neuromuscular signals and/or signals derived from the plurality of neuromuscular signals. The sensor data may be provided as input to one or more trained statistical models and the musculo-skeletal representation of the user may be determined based, at least in part, on an output of the one or more trained statistical models. Process 300 then proceeds to act 314, where an edit and/or correct operation is determined based on the sensor data. An instruction relating to the edit and/or correct operation of the speech recognizer is determined based on the determined musculo-skeletal representation, and the instruction is provided to the speech recognizer.

Next, process 300 proceeds to act 316 where the edit and/or correct operation is performed on the speech recognition results. For example, the edit and/or correct operation may be performed on the speech recognition results by allowing a user to edit and correct speech recognition results by selecting possibilities from a list. In another example, the edit and/or correct operation may be performed on the speech recognition results by allowing the user to initiate a spelling mode and correct spellings for one or more words in the speech recognition results. In yet another example, the edit and/or correct operation may be performed on the speech recognition results by allowing the user to delete one or more words in the speech recognition results. In another example, the edit and/or correct operation on the speech recognition results may be performed by allowing the user to scroll through the speech recognition results and insert one or more words at a desired insertion point in the speech recognition results. In another example, the edit and/or correct operation may be performed on the speech recognition results by allowing the user to select and replace one or more words in the speech recognition results. In another example, the edit and/or correct operation may be performed on the speech recognition results by auto-completing a frequently used phrase in the speech recognition results or allowing the user to select from a list of suggested completions for a phrase in the speech recognition results.

Figure 4:
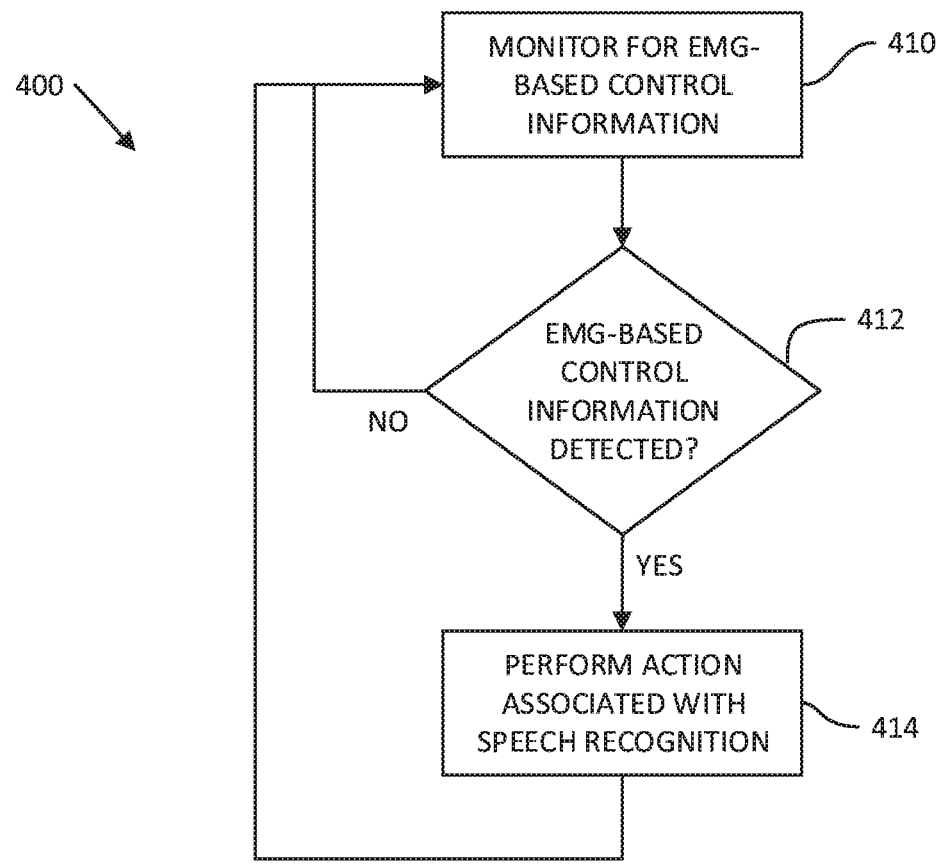
FIG. 4 is a flowchart of yet another illustrative process for using neuromuscular information to improve speech recognition, in accordance with some embodiments of the technology described herein.

FIG. 4 describes a process 400 for using neuromuscular information to improve speech recognition. Process 400 may be executed by any suitable computing device(s), as aspects of the technology described herein are not limited in this respect. For example, process 400 may be executed by processor(s) 112 described with reference to FIG. 1. As another example, one or more acts of process 400 may be executed using one or more servers (e.g., servers included as a part of a cloud computing environment). For example, at least a portion of act 412 relating to detecting EMG-based control information may be performed using a cloud computing environment. Although process 400 is described herein with respect to IMU and EMG signals, it should be appreciated that process 400 may determine neuromuscular information based on any recorded autonomous signals including, but not limited to, IMU signals, EMG signals, MMG signals, SMG signals, or any suitable combination thereof and a trained statistical model trained on such autonomous signals.

Process 400 begins at act 410, where control information is monitored, e.g., for one or more movements or activations performed by the user. For example, process 400 may monitor one or more EMG signals relating to neuromuscular information while speech data is obtained for one or multiple users from voice interface 120. Voice interface 120 may include a microphone that samples audio input at a particular sampling rate (e.g., 16 kHz). Sensor data relating to the control information may be received from sensors 110. The sensor data may include a plurality of neuromuscular signals and/or signals derived from the plurality of neuromuscular signals.

Next, process 400 proceeds to act 412, where it is determined whether control information relating to a particular movement or activation is detected. The sensor data may be provided as input to one or more trained statistical models and control information of the user may be determined based, at least in part, on an output of the one or more trained statistical models. The sensor data may be provided as input to a trained statistical model to determine control information as described with respect to FIG. 2.

If it is determined that control information for a particular movement or activation is detected, process 400 proceeds to act 414, where an action associated with speech recognition, and determined based on the detected control information, is performed. Otherwise, process 400 returns to act 410 to continue monitoring for control information. Performing an action with speech recognition may include, but is not limited to, altering a mode of the speech recognizer, starting or stopping the speech recognizer, or another suitable action associated with the speech recognizer. In another example, the user may perform a specific gesture to toggle the speech recognizer on and off, hold the gesture to keep the speech recognizer on, or hold a mute gesture to mute the speech recognizer. Determining an instruction for performing an action for the speech recognizer may be based on the determined control information, and the instruction may be provided to the speech recognizes. For example, the action associated with speech recognition may be performed by allowing a user to start or stop speech recognition, e.g., by making a gesture imitating a press of a button on a tape recorder. In another example, the action associated with speech recognition may be performed by allowing a user to initiate a spell check mode. In yet another example, the action associated with speech recognition may be performed by allowing a user to change the language of input by making a related gesture.

Figure 5:
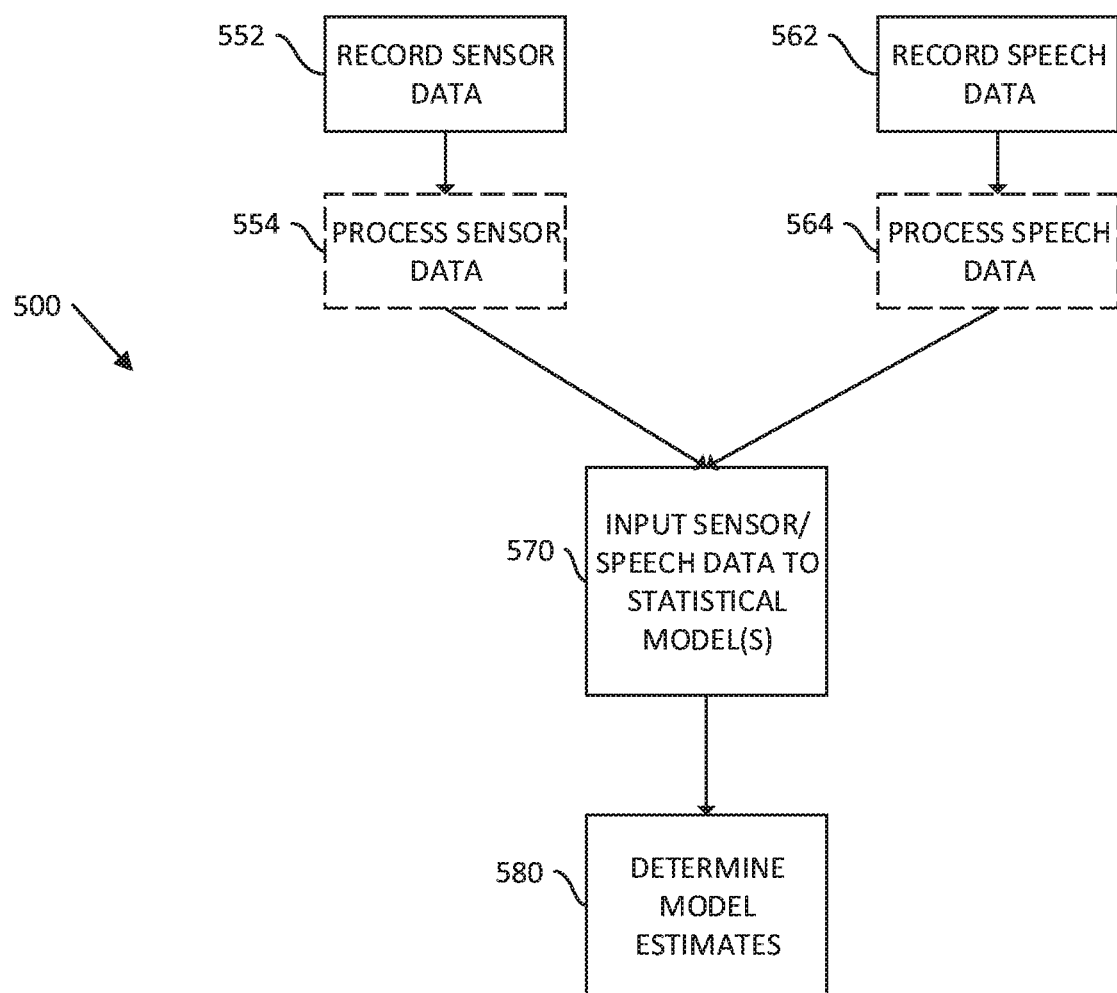
FIG. 5 is a flowchart of an illustrative process for using neuromuscular information to improve speech recognition in accordance with some embodiments of the technology described herein.

FIG. 5 describes a process 500 for using neuromuscular information to improve speech recognition. Process 500 may be executed by any suitable computing device(s), as aspects of the technology described herein are not limited in this respect. For example, process 500 may be executed by processor(s) 112 described with reference to FIG. 1. As another example, one or more acts of process 500 may be executed using one or more servers (e.g., servers included as a part of a cloud computing environment). For example, at least a portion of act 580 relating to determining model estimates may be performed using a cloud computing environment. Although process 500 is described herein with respect to IMU and EMG signals, it should be appreciated that process 500 may determine neuromuscular information based on any recorded autonomous signals including, but not limited to, IMU signals, EMG signals, MMG signals, SMG signals, or any suitable combination thereof and a trained statistical model trained on such autonomous signals.

In some embodiments, process 500 provides for a hybrid neuromuscular and speech input interface where a user may fluidly transition between using speech input, using neuromuscular input or using both speech input and neuromuscular input to perform speech recognition. The neuromuscular input may track body position information, movement, hand state, gestures, activations (e.g., from muscle fibers too weak to cause noticeable movement) or other suitable information relating to the plurality of recorded neuromuscular signals. In some embodiments, the speech input and neuromuscular input are used to provide for lower error rates in speech recognition. In other embodiments, the speech input and the neuromuscular input may be used selectively where one mode of input is preferable over the other. For example, in situations where it is not possible to speak aloud, only the neuromuscular input may be used to perform recognition.

At act 552 of process 500, sensor data is recorded, e.g., from sensors 110, and at act 554, the recorded sensor data is optionally processed. The sensor data may include a plurality of neuromuscular signals and/or signals derived from the plurality of neuromuscular signals. At act 562 of process 500, speech data is recorded, e.g., from one or multiple users from voice interface 120, and at act 564, the recorded speech data is optionally processed. Voice interface 120 may include a microphone that samples audio input at a particular sampling rate (e.g., 16 kHz), and the speech data may be recorded by sampling audio input received by the microphone.

At act 570 of process 500, one or both of the processed or unprocessed sensor data and speech data is provided as input to one or more trained statistical models. In some embodiments, both sensor data and speech data are input to the trained statistical model(s) to provide for lower speech recognition error rates. The statistical model(s) may be trained on both inputs used in parallel. In some embodiments, only one of the sensor data or the speech data may be provided as input to the trained statistical models. The statistical models trained on both inputs may be configured to gracefully transition between speech-only mode, sensor-mode, and combined speech+sensor data mode based on particular conditions of the system use, for example, when only one input is available. In some embodiments, both the speech data, e.g., audio input, and the sensor data, e.g., a plurality of neuromuscular signals, are provided as input to the one or more trained statistical models. The audio input may be provided as input to the one or more trained statistical models at a first time and the plurality of neuromuscular signals is provided as input to the one or more trained statistical models at a second time different from the first time. Alternatively, the speech data and the sensor data may be provided as input to the one or more trained statistical models simultaneously or at a substantially same time.

At act 580 of process 500, a speech recognition result (e.g., text) for the input sensor and/or speech data is determined based, at least in part, on an output of the one or more trained statistical models. In some embodiments, the speech recognition result is determined by processing the audio input to determine a first portion of the text, and by processing the plurality of neuromuscular signals to determine a second portion of the text. In some embodiments, the one or more trained statistical models include a first trained statistical model for determining the text based on the audio input and a second trained statistical model for determining the text based on the plurality of neuromuscular signals.

The speech recognition result may be determined for at least a first portion of the text based on a first output of the first trained statistical model. In some embodiments, the text is further determined for at least a second portion of the text based on a second output of the second trained statistical model. In some embodiments, the first portion and the second portion are overlapping. For example, the first three-quarters of the text may be determined using speech input whereas the second three-quarters of the text may be determined using neuromuscular input, with the middle of the text being determined using both speech and neuromuscular input. In this example, the user may have provided both speech input and neuromuscular input from the one-quarter mark to the three-quarter mark, while only providing speech input or neuromuscular input otherwise. In some embodiments, the first portion and the second portion are non-overlapping. For example, the first half of the text may be determined using speech input whereas the second half of the text may be determined using neuromuscular input.

In some embodiments, one or more statistical models for a hybrid neuromuscular and speech input interface are provided such that a first statistical model is trained for determining the text based on the audio input and a second statistical model is trained for determining the text based on the plurality of neuromuscular signals. Such a model implementation may be advantageous for faster training of new movements or activations because only the second statistical model need be updated in the training process. It is noted that the model implementation for the hybrid neuromuscular and speech input interface need not be limited to the described implementation. For example, such systems may employ one model for processing both neuromuscular and speech inputs or multiple models for processing each of the neuromuscular and speech inputs. Further details on how to combine the outputs of such models are provided below.

In some embodiments, an ASR model is provided and subsequently trained to personalize the ASR model according to EMG-based sensor data received for the user. For example, the ASR model may be provided as an artificial neural network with one or more layers, each layer including nodes with assigned weights. A layer of the artificial neural network may receive input in the form of EMG-based sensor data to learn the movements or activations from the user and corresponding output, e.g., text. Alternatively or additionally, the weights in one or more layers of the artificial neural network may be adapted to learn the movements or activations from the user and corresponding output. In some embodiments, a single model receives both speech data and EMG-based sensor data as inputs and the model is trained to generate output corresponding to these inputs. For example, the model may be provided with data collected as the user speaks, e.g., a phrase, and performs a corresponding movement or activation. In some embodiments, an engineered combination of models is provided where EMG-based sensor data relating to neuromuscular information is used to switch between one or more trained statistical models trained on speech data. For example, the EMG-based sensor data may be used to determine when a user makes a movement or activation to switch a language mode of the speech recognizer. Accordingly, if it is determined that the user desires a different language mode, the trained statistical model corresponding to the desired language mode is selected.

In some embodiments, the output predictions of a first statistical model (trained for determining text based on speech data, also referred to as a language model) and a second statistical model (trained for determining text based on sensor data, such as EMG signals) are combined as described below.

For notation, $P(A|B)$ is defined as the conditional probability of A given B. The language model may give a prior distribution $P(\text{text})$ over the possible text utterances. Bayes rule may be applied to calculate the probability of the text given the observed speech and EMG sensor data, according to the following formula:

$$P(\text{text}|\text{speech},\text{EMG}) = P(\text{speech},\text{EMG}|\text{text}) * P(\text{text}) / P(\text{speech},\text{EMG})$$

For optimizing the output predictions, i.e., text, the term $P(\text{speech}, \text{EMG})$ may be ignored and the combination may focus on the proportionality relationship, according to the following formula:

$$P(\text{text}|\text{speech},\text{EMG}) \sim P(\text{speech},\text{EMG}|\text{text}) * P(\text{text})$$

The speech data and the EMG data may be assumed to be conditionally independent given the output text, according to the following formula:

$$P(\text{speech},\text{EMG}|\text{text}) = P(\text{speech}|\text{text}) * P(\text{EMG}|\text{text})$$

This assumption yields following formula:

$$P(\text{text}|\text{speech},\text{EMG}) \sim P(\text{speech}|\text{text}) * P(\text{EMG}|\text{text}) * P(\text{text})$$

In embodiments where the individual models have a stage at which they output these conditional probabilities, the above formula may be applied directly.

In embodiments where the models output the $P(\text{text}|\text{speech})$ and $P(\text{text}|\text{EMG})$, Bayes rule may be applied, according to the following formulas:

$$P(\text{speech}|\text{text}) = P(\text{text}|\text{speech}) * P(\text{speech}) / P(\text{text}), \text{ and}$$

$$P(\text{EMG}|\text{text}) = P(\text{text}|\text{EMG}) * P(\text{EMG}) / P(\text{text})$$

These two equations may be substituted into the formula derived above, according to the following formula:

$$P(\text{text}|\text{speech},\text{EMG}) \sim P(\text{text}|\text{speech}) * P(\text{speech}) * P(\text{text}|\text{EMG}) * P(\text{EMG}) / P(\text{text})$$

Finally, the terms with just speech and EMG may be dropped because output predictions are being optimized over text, according to the following formula:

$$P(\text{text}|\text{speech},\text{EMG}) \sim P(\text{text}|\text{speech}) * P(\text{text}|\text{EMG}) / P(\text{text})$$

This formula combines a speech model that gives $P(\text{text}|\text{speech})$ with an EMG model that gives $P(\text{text}|\text{EMG})$.

In some embodiments, only one of the substitutions may be applied if a model gives P(EMG|text), according to the following formula:

$$P(\text{text}|\text{speech},\text{EMG}) \sim P(\text{text}|\text{speech}) * P(\text{EMG}|\text{text})$$

In some embodiments, the prior distribution of words/phrases in the language model is altered, e.g., when the gesture provides context for interpreting the speech. For example, the gesture may be a natural gesture a user makes in a given context to switch modes, such as a making a first gesture to switch to a proper noun mode. In proper noun mode, the language model output is biased such that proper nouns have a higher prior probability. If the language model is made aware of the upcoming input of a proper noun, the output of the model is more likely to be text for a proper noun. For example, the prior probability of proper nouns may be multiplied by a number greater than one to increase the bias for proper nouns. The language model may function in the same manner as before the switch to proper noun mode, except for applying a higher prior probability to proper nouns.

In some embodiments, the described systems and methods allow for obtaining one or more neuromuscular signals (e.g., EMG signals) in parallel with or substantially at the same time as obtaining speech data for one or multiple users. The neuromuscular information derived from the signals may be used to modify the behavior of the speech recognizer, e.g., switch to another mode of the speech recognizer. For example, neuromuscular information derived from neuromuscular signals from a user may indicate that the user wishes to activate a "spell mode" of the speech recognizer. Accordingly, the neuromuscular information may be used to switch the mode of the speech recognizer to character-based text entry. The user may make movements or activations and the corresponding neuromuscular information may be used to interpret the characters the user wishes to enter. Subsequently, neuromuscular information derived from neuromuscular signals from the user may indicate that the user wishes to deactivate the "spell mode" of the speech recognizer. In this manner, the user may alternate between speech input (e.g., to enter words) and neuromuscular input (e.g., to enter characters) in order to enter the desired text. In some embodiments, when switching to "spell mode," the speech recognizer swaps a language model suitable for speech input (e.g., to enter words) with another language model suitable for neuromuscular input (e.g., to enter characters). In some embodiments, when switching to "spell mode," the language model output is biased towards character-based text entry. For example, a prior distribution in the language model is selected to better recognize character-based entry. If the language model is made aware of the upcoming input of character-based text entry, the output of the model is more likely to recognize the characters as spelling out one or more words.

Some embodiments of the systems and methods described herein provide for determining text input with model(s) that use a linguistic token, such as phonemes, characters, syllables, words, sentences, or another suitable linguistic token, as the basic unit of recognition. An advantage of using phonemes as the linguistic token may be that using a phoneme-based representation is more similar to the natural speech language processing than character-based typing. Additionally, using a phoneme-based model may provide faster recognition performance than a character-based model approach because the phoneme-based approach uses a denser encoding compared to using characters.

For the implementation using phonemes as the linguistic token, the inventors have recognized that creating a phoneme-based vocabulary that is easy to learn and recognize may be challenging in part because the number of phonemes in a language (e.g., 36 phonemes for English) may be larger than the number of characters in the language (e.g., 26 characters). In some embodiments, the text input may be performed using an adaptive movement or activation information recognizer instead of a fixed phoneme vocabulary. In some embodiments, a speech synthesizer provides audio feedback to the user while the user trains the adaptive system to create a mapping between body position information (e.g., movement, hand states, and/or gestures) and phonemes. In some embodiments, the training system may be presented to the user as a game, e.g. a mimicry game. Language models may be applied to the input, similar to a speech recognizer, to decode EMG signals through soft phoneme predictions into text.

In some embodiments, the described systems and methods allow for the user to "speak" with their hands by providing hand states that correspond to different linguistic tokens, such as phonemes. For example, some gesture-based language techniques, such as American Sign Language, map gestures to individual characters (e.g., letters) or entire words. Some embodiments are directed to allowing the user to "speak" with their hands using an intermediate level of representation between characters and entire words, that more closely represents speech production. For example, a phoneme representation may be used and a model may map the user's hand states to particular phonemes. A phoneme-based system may provide a measure of privacy because a user may perform the movement or activation, such as the gesture, without moving or with little motion. It is noted that such movement-free or limited-movement systems need not be limited to using phonemes as their linguistic token. For example, such systems may use another linguistic token, such as characters. Such a system may also enable the user to provide input faster than they could using individual characters, but without having to learn movements or activations for a large vocabulary of words. For example, a phoneme-based system may provide for a speed of 200 words per minute, which is faster than a typical character typing rate. It is noted that such systems may additionally or alternatively use another linguistic token, such as common letter combinations found on a stenographer's keyboard.

In some embodiments, the described systems and methods allow for the user to "speak" with their hands by providing movement or activation that correspond to different linguistic tokens, such as characters. In using such a character representation, a model may map EMG signals for the user's hand states to particular characters. For example, the user may type on a flat surface as if it were a keyboard and perform hand states for keys corresponding to the characters the user wishes to enter. Such a character-based text entry (e.g., via detection of EMG signals) may be combined with speech-based text entry. The user may use speech-based text entry for initial text but, for example at a later point in time, switch modes to character-based text entry (e.g. enter "spell mode") and input hand states corresponding to the characters the user wishes to enter. In other embodiments, speech-based entry may be processed in parallel with text entry, such as using a speech command to change entry mode while typing (e.g., changing to all capitals, executing a control key operation, etc.) or modify a current input from or output to another device (e.g., a keyboard, a heads-up display, etc.). Any combination of entry using speech-based recognition and EMG signal processing may be performed to derive one or more multi-dimensional input/output mode(s) according to various embodiments.

In some embodiments, the described systems and methods allow for adaptive training of one or more statistical models to map neuromuscular information to linguistic tokens, such as phonemes. For example, the user may be asked to produce one or more simple words using hand states corresponding to phonemes. In some embodiments, the training may not be directed to explicitly generating neuromuscular information, e.g., for a gesture, to phoneme mappings for the user. Instead, the user may be asked to produce hand states for one or more words and the statistical models may be adapted based on the information learned from this process. For example, the user may be presented with a user interface that displays a training "game," where the user earns points for every correct hand state made to produce one or more target words. In some embodiments, a speech synthesizer may provide audio feedback to the user based on the phonemes produced by the user's hand states. The feedback may provide the user understanding on how to improve his or her hand states to produce the correct phonemes for the target words.

In some embodiments, the described systems and methods allow for the user to define an individualized mapping from neuromuscular information to linguistic tokens such as phonemes, by selecting what hand state, gesture, movement, or activation to use for each phoneme. For example, the user may train the one or more statistical models using small finger movements or muscle activations detectable by sensors 110. If two movements are close to each other, the user may be asked to make the movement slightly differently to distinguish between the two movements. In some embodiments, feedback may be provided by the system to the user to encourage the user to produce movements or activations that are distinct from each other to enable the system to learn a better mapping from movement or activation to phoneme.

In some embodiments, a pre-trained fixed mapping, analogous to typing on a regular keyboard may be provided and the pre-trained mapping may be adapted or individualized to the user's movement or activation characteristics as the user uses the system. In such an adaptive system, the user may be able to minimize their movement over time to achieve the same system performance, such that smaller and smaller movements may be sufficient to produce neuromuscular signals mapped to different phonemes recognizable by the system. The system may be configured to adapt to the user's movements or activations in the background as the user is performing typical everyday tasks. For example, the system may be configured to track keys pressed by a user (e.g., using a key logger) as the user wears the wearable device of the system while typing on a keyboard, and the system may be configured to determine mappings between neuromuscular information, as the user types, and the recorded keystrokes.

Moreover, the system may not be limited to training in a phase separate from use of the system. In some embodiments, the system is configured to adapt a pre-trained mapping or another suitable mapping based on information from tracking a signal from the user indicating an erroneous text entry. For example, the signal may include a voice command (e.g., "backspace," "undo," "delete word," or another suitable voice command indicating an error was made), one or more neuromuscular signals (e.g., a gesture relating to a command, such as "backspace," "undo," "delete word," or another suitable command indicating an error was made), a signal from the user accepting an auto-correction of an erroneous text entry, or another suitable user signal indicating an erroneous text entry. The system may adapt a pre-trained mapping or another suitable mapping to the user based on this tracked information.

In some embodiments, the system is configured to adapt a pre-trained mapping or another suitable mapping based on consistency with a language model. For example, in absence of the adaptation to the language model, the system may determine output text to be "she yikes to eat ice cream," instead of "she likes to eat ice cream." The language model may include prior probabilities of certain combinations of words, phrases, sentences, or another suitable linguistic token, and the system may select the output text corresponding to a higher probability in the language model. For example, the language model may indicate that the phrase "likes to eat" has a higher probability than the phrase "yikes to eat." Accordingly, to be consistent with the language model, the system may adapt the pre-trained mapping or another suitable mapping and select output text having the higher probability, e.g., "she likes to eat ice cream."

In some embodiments, the system is configured to map neuromuscular information (derived from one or more neuromuscular signals, e.g., EMG signals) to an error indication from the user. For example, the user may tense one or more muscles after the system erroneously interprets a word the user spoke correctly. The neuromuscular signals relating to that movement or activation from the user may be mapped as an error indication from the user. In this manner, the user is not required to provide a training signal particularly relating to an error indication. In some embodiments, when the system detects neuromuscular information relating to the error indication, the system automatically corrects the error. For example, the system may automatically delete the last interpreted word. In another example, the system may provide the user with one or more options to correct the last interpreted word. In yet another example, the system may automatically replace the last interpreted word with another interpretation based on a language model. In some embodiments, the system may further adapt the pre-trained mapping or another suitable mapping based on the detected error indication. For example, the system may modify a language model associated with the speech recognizer to implement the correct interpretation. The system having been configured to detect the error indication may be able to differentiate between a case when the user made an error (e.g., the user spoke the wrong word) and a case when the speech recognizer made an error (e.g., the user spoke the correct word, but the speech recognizer interpreted it incorrectly). For example, the user may speak the word "yike" instead of "like," and the speech recognizer may interpret the word correctly as "yike." In this case, the system may detect the error to be a user error. In another example, the user may speak the word "like," but the speech recognizer may interpret the word incorrectly as "yike." The system may leverage the capability to separately detect these two types of errors to improve further adaptation of the pre-trained mapping or another suitable mapping to the user.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computerized system for using neuromuscular information to improve speech recognition, the system comprising:
   at least one input interface configured to capture speech data produced by a user;
   one or more neuromuscular sensors configured to be worn on the user's wrist and detect one or more neuromuscular signals from the user's wrist corresponding to one or more movements of an arm, a wrist, and/or a hand of the user;
   a memory storing a statistical model trained to:
   take, as input, the one or more neuromuscular signals obtained from the user's wrist and/or information based on the one or more neuromuscular signals obtained from the user's wrist; and
   output information indicative of activation states of muscles within the arm, the wrist, and/or the hand of the user; and
   at least one computer processor programmed to:
   obtain the speech data using the input interface;
   obtain the one or more neuromuscular signals from the user's wrist;
   use the statistical model to infer from the one or more neuromuscular signals obtained from the user's wrist and/or the information based on the one or more neuromuscular signals obtained from the user's wrist, an activation state of a muscle of the user's arm, wrist, or hand; and
   use the inferred activation state of the muscle of the user's arm, wrist, or hand to improve recognition of the speech data.

2. The computerized system of claim 1, wherein both the speech data and the one or more neuromuscular signals obtained from the user's wrist are simultaneously captured from the user.

3. The computerized system of claim 1, wherein the activation state of the muscle of the user's arm, wrist, or hand comprises an activation state of one or more muscle subunits within the muscle of the user's arm, wrist, or hand.

4. The computerized system of claim 1, wherein:
   the speech data are captured before the one or more neuromuscular signals are obtained from the user's wrist;
   the at least one computer processor is further programmed to:
   predict a textual representation of the speech data based on the speech data; and
   display, before obtaining the one or more neuromuscular signals from the user's wrist, the textual representation of the speech data to the user via a user interface; and
   using the inferred activation state of the muscle of the user's arm, wrist, or hand to improve recognition of the speech data comprises:
   detecting, based on the inferred activation state of the muscle of the user's arm, wrist, or hand, the user's indication of an error in speaking; and
   modifying the textual representation of the speech data within the user interface in response to the user's indication.

5. The computerized system of claim 1, wherein:
   the speech data are captured before the one or more neuromuscular signals are obtained from the user's wrist;
   the at least one computer processor is further programmed to:
   predict a textual representation of the speech data based on the speech data; and display, before obtaining the one or more neuromuscular signals from the user's wrist, the textual representation of the speech data to the user via a user interface; and using the inferred activation state of the muscle of the user's arm, wrist, or hand to improve recognition of the speech data comprises:

detecting, based on the inferred activation state of the muscle of the user's arm, wrist, or hand, the user's indication of an error in predicting the textual representation of the speech data from the speech data;

predicting an alternative textual representation of the speech data; and displaying the alternative textual representation of the speech data to the user via the user interface.

6. The computerized system of claim 1, wherein using the inferred activation state of the muscle of the user's arm, wrist, or hand to improve recognition of the speech data comprises:

deriving contextual information from the inferred activation state of the muscle of the user's arm, wrist, or hand; and predicting a textual representation of the speech data based on the speech data and the contextual information derived from the inferred activation state of the muscle of the user's arm, wrist, or hand.

7. The computerized system of claim 6, wherein predicting the textual representation of the speech data comprises predicting at least a first portion of the textual representation of the speech data based on the speech data but not the contextual information.

8. The computerized system of claim 7, wherein predicting the textual representation of the speech data comprises predicting at least a second portion of the textual representation of the speech data based on the contextual information but not the speech data.

9. The computerized system of claim 1, wherein using the statistical model to infer the activation state of the muscle of the user's arm, wrist, or hand comprises using the one or more neuromuscular signals obtained from the user's wrist and/or the information based on the one or more neuromuscular signals obtained from the user's wrist to infer an activated state of a muscle fiber within the muscle of the user's arm, wrist, or hand and a substantially simultaneous deactivated state of an additional muscle fiber within the same muscle of the user's arm, wrist, or hand.

10. The computerized system of claim 1, wherein the muscle is located within the user's arm.

11. A computer-implemented method for using neuromuscular information to improve speech recognition, the method comprising:

obtaining, via an input interface, speech data produced by a user;

obtaining, via one or more neuromuscular sensors worn on the user's wrist, one or more neuromuscular signals from the user's wrist corresponding to one or more movements of an arm, a wrist, and/or a hand of the user;

using a statistical model to infer, from the one or more neuromuscular signals obtained from the user's wrist and/or information based on the one or more neuromuscular signals obtained from the user's wrist, an activation state of a muscle of the user's arm, wrist, or hand, wherein the statistical model is trained to:

take, as input, the one or more neuromuscular signals obtained from the user's wrist and/or information based on the one or more neuromuscular signals obtained from the user's wrist; and output information indicative of activation states of muscles within the arm, the wrist, and/or the hand of the user; and using the inferred activation state of the muscle of the user's arm, wrist, or hand to improve recognition of the speech data.

12. The method of claim 11, wherein the muscle is located within the user's arm.

13. The method of claim 11, further comprising training the statistical model to output information indicative of activation states of muscle subunits within the muscle of the user's arm, wrist, or hand, wherein using the statistical model to infer the activation state of the muscle of the user's arm, wrist, or hand comprises:

inputting, to the statistical model, the one or more neuromuscular signals obtained from the user's wrist and/or the information based on the one or more neuromuscular signals obtained from the user's wrist; and inferring, from a corresponding output of the statistical model, an activation state of one or more muscle subunits within the muscle of the user's arm, wrist, or hand.

14. The method of claim 13, wherein:

the speech data are captured before the one or more neuromuscular signals are obtained from the user's wrist;

the computer-implemented method further comprises:

predicting a textual representation of the speech data based on the speech data; and displaying the textual representation of the speech data to the user via a user interface before obtaining the one or more neuromuscular signals from the user's wrist; and using the inferred activation state of the muscle of the user's arm, wrist, or hand to improve recognition of the speech data comprises:

detecting, based on the inferred activation state of the muscle of the user's arm, wrist, or hand, the user's indication of an error in speaking; and modifying the textual representation of the speech data within the user interface in response to the user's indication.

15. The method of claim 13, wherein:

the speech data are captured before the one or more neuromuscular signals are obtained from the user's wrist;

the computer-implemented method further comprises:

predicting a textual representation of the speech data based on the speech data; and displaying the textual representation of the speech data to the user via a user interface before obtaining the one or more neuromuscular signals from the user's wrist; and using the inferred activation state of the muscle of the user's arm, wrist, or hand to improve recognition of the speech data comprises:

detecting, based on the inferred activation state of the muscle of the user's arm, wrist, or hand, the user's indication of an error in predicting the textual representation of the speech data from the speech data;

predicting an alternative textual representation of the speech data; and displaying the alternative textual representation of the speech data to the user via the user interface.

16. The method of claim 11, wherein using the inferred activation state of the muscle of the user's arm, wrist, or hand to improve recognition of the speech data comprises:
deriving contextual information from the inferred activation state of the muscle of the user's arm, wrist, or hand; and
predicting a textual representation of the speech data based on the speech data and the contextual information derived from the inferred activation state of the muscle of the user's arm, wrist, or hand.

17. The method of claim 16, wherein predicting the textual representation of the speech data comprises determining at least a first portion of the textual representation of the speech data based on the speech data but not the contextual information.

18. The method of claim 17, wherein predicting the textual representation of the speech data further comprises predicting at least a second portion of the textual representation of the speech data based on the contextual information derived from the one or more contemporaneous neuromuscular signals obtained from the user's wrist but not the speech data.

19. The method of claim 18, wherein the first portion and the second portion are overlapping.

20. The method of claim 18, wherein the first portion and the second portion are non-overlapping.

21. The method of claim 16, wherein:
the contextual information is associated with a context in which the speech data was obtained from the user; and
predicting the textual representation of the speech data comprises determining a textual representation of the speech data most likely conveyed by the speech data in the context.

22. The method of claim 16, wherein:
the contextual information comprises information about the one or more movements of the arm, the wrist, and/or the hand of the user; and
predicting the textual representation of the speech data comprises interpreting the speech data based on the information about the one or more movements of the arm, the wrist, and/or the hand of the user.

23. A computerized system for using neuromuscular information to improve speech recognition, the system comprising:
at least one input interface configured to capture speech data produced by a user;
one or more neuromuscular sensors configured to be worn on the user's wrist and detect one or more neuromuscular signals from the user's wrist corresponding to one or more movements of an arm, a wrist, and/or a hand of the user;
a memory storing a statistical model trained to:
take, as input, the one or more neuromuscular signals obtained from the user's wrist and/or information based on the one or more neuromuscular signals obtained from the user's wrist; and
output information indicative of activation states of muscle subunits within a muscle of the arm, the wrist, and/or the hand of the user; and
at least one computer processor programmed to:
obtain the speech data from the input interface;
obtain the one or more neuromuscular signals from the user's wrist;
use the statistical model to infer, from the one or more neuromuscular signals obtained from the user's wrist and/or the information based on the one or more neuromuscular signals obtained from the user's wrist, an activation state of one or more muscle subunits within the muscle of the arm, the wrist, and/or the hand of the user; and
use the inferred activation state of the one or more muscle subunits within the muscle of the arm, the wrist, and/or the hand of the user to improve recognition of the speech data.

24. The computerized system of claim 23, further comprising:
a user interface configured to display visual feedback to the user, wherein the visual feedback is generated based on the inferred activation state of the one or more muscle subunits within the muscle of the arm, the wrist, and/or the hand of the user.

* * * * *

UNITED STATES PATENT AND TRADEMARK OFFICE
CERTIFICATE OF CORRECTION

PATENT NO. : 11,216,069 B2
APPLICATION NO. : 15/974430
DATED : January 4, 2022
INVENTOR(S) : Adam Berenzweig et al.

Page 1 of 1

It is certified that error appears in the above-identified patent and that said Letters Patent is hereby corrected as shown below:

In the Claims

Column 22, Line 21, Claim 1, delete "infer" and insert -- infer, --.

Signed and Sealed this
Third Day of May, 2022

Katherine Kelly Vidal
*Director of the United States Patent and Trademark Office*